(12) United States Patent
Gan et al.

(10) Patent No.: US 11,693,552 B2
(45) Date of Patent: Jul. 4, 2023

(54) DISPLAY PROCESSING METHOD AND ELECTRONIC DEVICE

(71) Applicant: Huawei Technologies Co., Ltd., Shenzhen (CN)

(72) Inventors: Yuanli Gan, Shenzhen (CN); Wei Feng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/477,235

(22) Filed: Sep. 16, 2021

(65) Prior Publication Data

US 2022/0075516 A1    Mar. 10, 2022

Related U.S. Application Data

(63) Continuation of application No. 16/754,598, filed as application No. PCT/CN2017/106146 on Oct. 13, 2017, now Pat. No. 11,137,891.

(30) Foreign Application Priority Data

Oct. 9, 2017  (CN) .......................... 201710931363.0

(51) Int. Cl.
   *G06F 3/04847*    (2022.01)
   *G06F 40/109*     (2020.01)
   *G06F 3/04842*    (2022.01)

(52) U.S. Cl.
   CPC ...... *G06F 3/04847* (2013.01); *G06F 3/04842* (2013.01); *G06F 40/109* (2020.01)

(58) Field of Classification Search
   CPC . G06F 3/04847; G06F 40/109; G06F 3/04842
   (Continued)

(56) References Cited

U.S. PATENT DOCUMENTS

| 5,559,944 A | 9/1996 | Ono |
| 2006/0112333 A1 | 5/2006 | Iwanaga |

(Continued)

FOREIGN PATENT DOCUMENTS

| CN | 1075220 A | 8/1993 |
| CN | 101127035 A | 2/2008 |

(Continued)

OTHER PUBLICATIONS

"Modify the text and icon of the 'Back' button in the navigation bar," Brief Book, Mar. 25, 2017, 5 pages.

(Continued)

*Primary Examiner* — William D Titcomb
(74) *Attorney, Agent, or Firm* — Slater Matsil, LLP

(57) ABSTRACT

A display processing method is provided, comprising: displaying, by an electronic device, a first display object and a second display object on a first screen based on a first positional relationship; in response to determining that a length of a to-be-displayed character string corresponding to the first display object is greater than a first width of the first display object on the first screen, stopping displaying the first screen; and displaying the first display object and the second display object on a second screen, where the first display object and the second display object on the second screen have a second positional relationship, the second positional relationship is different from the first positional relationship, and a second width of the first display object corresponding to the second positional relationship is greater than the first width.

18 Claims, 28 Drawing Sheets

(58) Field of Classification Search
USPC .......................................................... 715/771
See application file for complete search history.

(56) References Cited

U.S. PATENT DOCUMENTS

| | | | |
|---|---|---|---|
| 2006/0253796 A1 | 11/2006 | Wang et al. | |
| 2008/0092082 A1 | 4/2008 | Saito et al. | |
| 2010/0050121 A1 | 2/2010 | Shin | |
| 2010/0145676 A1 | 6/2010 | Rogers | |
| 2011/0034216 A1 | 2/2011 | Yoshino | |
| 2013/0016046 A1 | 1/2013 | Chou et al. | |
| 2013/0263039 A1* | 10/2013 | Fahlgren | G06F 3/0238 715/780 |
| 2014/0157188 A1 | 6/2014 | Miura | |
| 2015/0095833 A1 | 4/2015 | Kim et al. | |
| 2015/0248235 A1* | 9/2015 | Offenberg | G06F 3/0237 715/773 |
| 2016/0246763 A1* | 8/2016 | Higuchi | G09G 5/14 |

FOREIGN PATENT DOCUMENTS

| | | |
|---|---|---|
| CN | 101599264 A | 12/2009 |
| CN | 102027442 A | 4/2011 |
| CN | 102207870 A | 10/2011 |
| CN | 103870146 A | 6/2014 |
| CN | 105389083 A | 3/2016 |
| CN | 105786308 A | 7/2016 |
| CN | 105930034 A | 9/2016 |
| CN | 106325709 A | 1/2017 |
| EP | 0555034 A2 | 8/1993 |
| JP | H05282115 A | 10/1993 |
| JP | H08331293 A | 12/1996 |
| JP | 2007140986 A | 6/2007 |
| JP | 2007286742 A | 11/2007 |
| JP | 2009282827 A | 12/2009 |
| KR | 930018408 A | 9/1993 |
| KR | 20050049762 A | 5/2005 |
| RU | 2308761 C2 | 10/2007 |

OTHER PUBLICATIONS

GOST 7.83-2001, International Standard, "The system of standards for information, library and publishing," Electronic Editions, Basic views and output, Jul. 1, 2002, 35 pages.

Hollemans, M., "Beginning Auto Layout in iOS 6: Part 1/2," raywenderlich.com, Sep. 19, 2012, 17 pages.

* cited by examiner

Display a first display object and a second display object on a first screen based on a first positional relationship, and in response to determining that a length of a to-be-displayed character string corresponding to the first display object is greater than a first width of the first display object on the first screen, stop displaying the first screen ⟋ 200

Display the first display object and the second display object on a second screen, where the first display object and the second display object on the second screen have a second positional relationship, the second positional relationship is different from the first positional relationship, and a second width of the first display object corresponding to the second positional relationship is greater than the first width ⟋ 201

FIG. 5

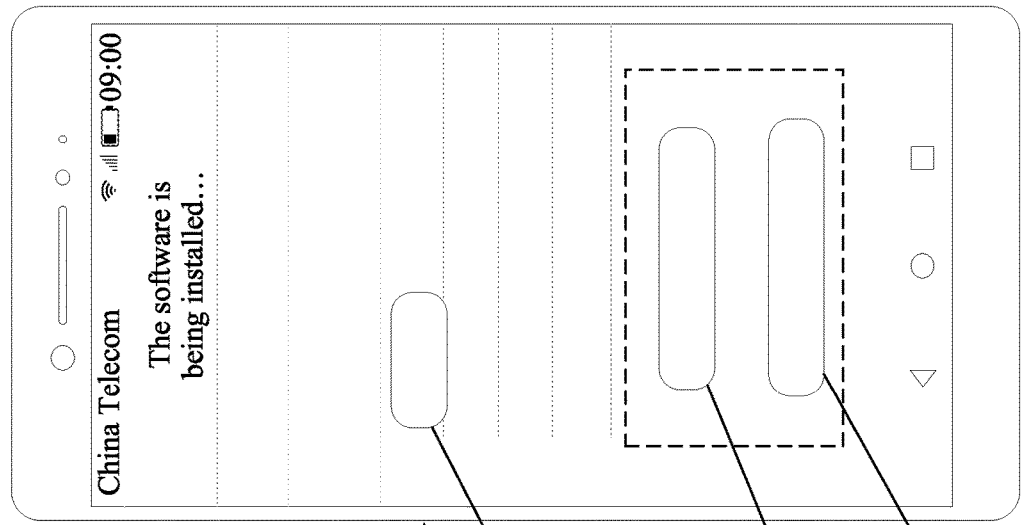
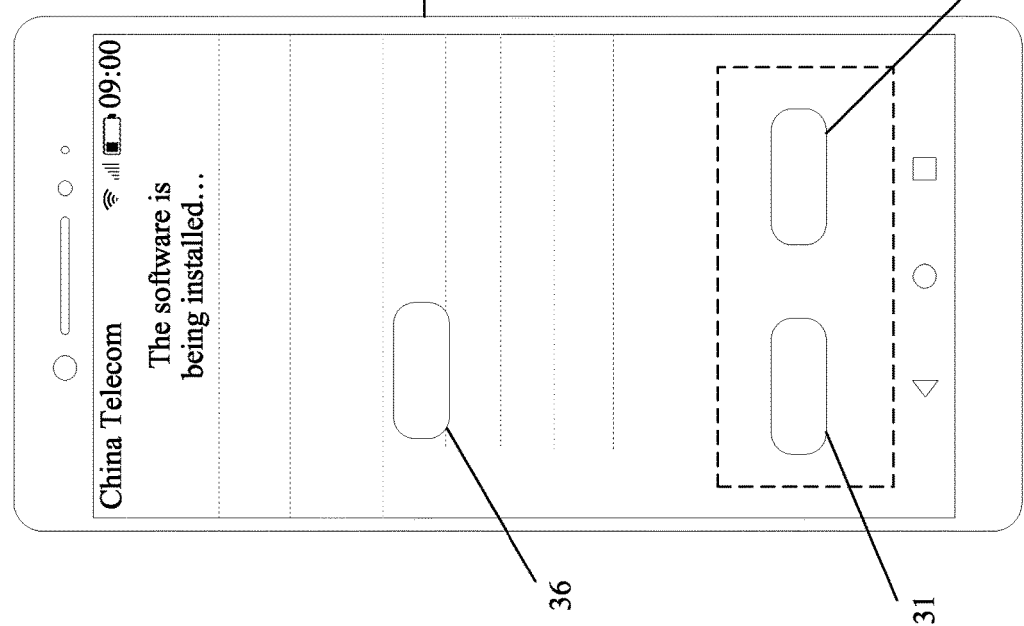
FIG. 12

DISPLAY PROCESSING METHOD AND ELECTRONIC DEVICE

CROSS-REFERENCE TO RELATED APPLICATIONS

This application is a continuation of U.S. patent application Ser. No. 16/754,598, filed on Apr. 8, 2020, which application is a national stage of International Patent Application No. PCT/CN2017/106146, filed on Oct. 13, 2017, which claims priority to Chinese Patent Application No. 201710931363.0, filed on Oct. 9, 2017. All of the aforementioned applications are hereby incorporated by reference in their entireties.

TECHNICAL FIELD

This application relates to the field of electronic technologies, and in particular, to a display processing method and an electronic device.

BACKGROUND

An electronic device can display a character string by using a display object such as a button, to present related prompt content to a user. In a process of using the electronic device, a length of a to-be-displayed character string corresponding to the display object may become longer due to reasons such as a change of a language type. In this case, referring to FIG. 1a, a width of the display object may not accommodate an entire to-be-displayed character string that has become longer. Consequently, a character sting displayed in the display object is truncated. Only one part of the to-be-displayed character string can be displayed in the display object, and the other part of the to-be-displayed character string cannot be displayed in the display object.

To resolve this problem, referring to FIG. 1b, a solution in the prior art is as follows: When a width of a display object cannot accommodate an entire to-be-displayed character string, the to-be-displayed character string is wrapped to a new line in the display object, and a height of the display object is correspondingly increased, so as to display, in the display object, the entire to-be-displayed character string corresponding to the display object.

In the solution provided in the prior art, identifiability of the to-be-displayed character string is relatively poor after the to-be-displayed character string is wrapped to a new line in the display object. In addition, the display object deforms due to the increased height, affecting an appearance of the display object and user experience.

SUMMARY

Embodiments of this application provide a display processing method and an electronic device, to increase a width of a display object by automatically changing a positional relationship between the display object and another display object, thereby providing a greater display width for a to-be-displayed character string.

To achieve the foregoing objective, the following technical solutions are used in the embodiments of this application.

According to a first aspect, an embodiment of this application provides a display processing method applied to an electronic device. The electronic device displays a first display object and a second display object on a first screen based on a first positional relationship. In response to determining that a length of a to-be-displayed character string corresponding to the first display object is greater than a first width of the first display object on the first screen, the electronic device stops displaying the first screen, and the electronic device displays the first display object and the second display object on a second screen. The first display object and the second display object on the second screen have a second positional relationship. The second positional relationship is different from the first positional relationship, and a second width of the first display object corresponding to the second positional relationship is greater than the first width.

In this way, the electronic device may increase a width of the first display object by automatically adjusting a positional relationship between the first display object and the second display object, thereby providing a greater width for displaying the to-be-displayed character string corresponding to the first display object, ensuring that the to-be-displayed character string can be entirely displayed in one line as far as possible, and preventing the to-be-displayed character string from being truncated when displayed.

In addition, because the to-be-displayed character string is not wrapped to a new line in the first display object, identifiability of the to-be-displayed character string is not affected, unlike the prior art, and appearances of a display object and a screen, and user experience are not affected due to deformation of the display object, unlike the prior art.

With reference to the first aspect, in a possible implementation, that the first display object and the second display object on the first screen have the first positional relationship includes: the first display object and the second display object on the first screen are arranged in parallel in a same horizontal direction. That the first display object and the second display object on the second screen have a second positional relationship includes: the first display object and the second display object on the second screen are not arranged in parallel in a same horizontal direction.

In this way, compared with the fact that the first display object and the second display object on the first screen are arranged in parallel in a same horizontal direction, when the first display object and the second display object on the second screen are not arranged in parallel in a same horizontal direction, impact of a width of the second display object on the width of the first display object may be reduced or avoided, thereby increasing the width of the first display object on the second screen.

With reference to the first aspect and the foregoing possible implementation, in another possible implementation, that the first display object and the second display object on the first screen and the second screen are not arranged in parallel in a same horizontal direction includes: the first display object and the second display object on the second screen are aligned in a same vertical direction; the first display object and the second display object on the second screen are arranged in a stepped shape in a vertical direction; the first display object and the second display object on the second screen are arranged in parallel in a same diagonal direction; or the first display object and the second display object on the second screen are arranged in different diagonal directions.

In this way, the impact of the width of the second display object on the width of the first display object may be reduced or avoided, thereby increasing the width of the first display object on the second screen.

With reference to the first aspect and the foregoing possible implementations, in another possible implementation, on the second screen, a height and a width of the first display object are the same as those of the second display object.

In this way, sizes of the first display object and the second display object can be kept consistent, thereby making the screen more elegant.

With reference to the first aspect and the foregoing possible implementations, in another possible implementation, a width of effective display space of an area in which the first display object is located on the first screen may include a sum of the width of the first display object and the width of the second display object on the first screen; or a width of effective display space of an area in which the first display object is located on the first screen may include a sum of the width of the first display object, the width of the second display object, and a gap between the first display object and the second display object on the first screen; or a width of effective display space of an area in which the first display object is located on the first screen may include a sum of the width of the first display object, the width of the second display object, a gap between the first display object and a screen boundary, and a gap between the second display object and the screen boundary on the first screen.

In this way, a length of the first display object is less than or equal to the width of the effective display space.

With reference to the first aspect and the foregoing possible implementations, in another possible implementation, that the electronic device displays the first display object and the second display object on a second screen includes: determining, by the electronic device, a width of effective display space of an area in which the first display object is located on the first screen; and if the length of the to-be-displayed character string corresponding to the first display object is less than or equal to the width of the effective display space, displaying, by the electronic device, the first display object and the second display object on the second screen; or if the length of the to-be-displayed character string corresponding to the first display object is greater than the width of the effective display space, decreasing, by the electronic device, a font size of a to-be-displayed character string corresponding to a target display object, where the target display object is the first display object, or the target display object is the first display object and the second display object; and if a length of the to-be-displayed character string corresponding to the first display object after the font size is decreased is less than or equal to the width of the effective display space, displaying, by the electronic device, the first display object and the second display object on the second screen; or if a length of the to-be-displayed character string corresponding to the first display object after the font size is decreased is greater than the width of the effective display space, and a font size of the to-be-displayed character string corresponding to the target display object after the font size is decreased is greater than a preset font size, continuing decreasing, by the electronic device, the font size of the to-be-displayed character string corresponding to the target display object.

In this way, because the impact of the width of the second display object on the width of the first display object is reduced, the width of the first display object is increased, and the increased length of the first display object is less than or equal to the width of the effective display space. Therefore, the electronic device may, based on a size relationship between the length of the to-be-displayed character string corresponding to the first display object and the width of the effective display space, display the first display object and the second display object on the second screen.

With reference to the first aspect and the foregoing possible implementations, in another possible implementation, that the electronic device displays the first display object and the second display object on a second screen further includes: if the length of the to-be-displayed character string corresponding to the first display object after the font size is decreased is greater than the width of the effective display space, and the font size of the to-be-displayed character string corresponding to the target display object after the font size is decreased is the preset font size, displaying, by the electronic device, the first display object and the second display object on the second screen.

In this way, when the font size of the to-be-displayed character string corresponding to the target display object after the font size is decreased is the preset font size, the electronic device may directly display the first display object and the second display object on the second screen.

With reference to the first aspect and the foregoing possible implementations, in another possible implementation, that the electronic device displays the first display object and the second display object on a second screen further includes: if the length of the to-be-displayed character string corresponding to the first display object after the font size is decreased is greater than the width of the effective display space, and the font size of the to-be-displayed character string corresponding to the target display object after the font size is decreased is the preset font size, replacing, by the electronic device, the to-be-displayed character string corresponding to the first display object with associated content, where a length of the associated content is less than or equal to the width of the effective display space; and displaying, by the electronic device, the first display object and the second display object on the second screen.

In this way, when the font size of the to-be-displayed character string corresponding to the target display object after the font size is decreased is the preset font size, the electronic device may replace the to-be-displayed character string with associated content whose length is shorter.

With reference to the first aspect and the foregoing possible implementations, in another possible implementation, that the electronic device displays the first display object and the second display object on a second screen includes: determining, by the electronic device, a width of effective display space of an area in which the first display object is located on the first screen; and if the length of the to-be-displayed character string corresponding to the first display object is less than or equal to the width of the effective display space, displaying, by the electronic device, the first display object and the second display object on the second screen; or if the length of the to-be-displayed character string corresponding to the first display object is greater than the width of the effective display space, replacing, by the electronic device, the to-be-displayed character string corresponding to the first display object with associated content, where a length of the associated content is less than or equal to the width of the effective display space; and displaying, by the electronic device, the first display object and the second display object on the second screen.

In this way, when the length of the to-be-displayed character string corresponding to the first display object is greater than the width of the effective display space, the electronic device may replace the to-be-displayed character string with associated content whose length is shorter.

With reference to the first aspect and the foregoing possible implementations, in another possible implementation, the associated content includes at least one of another character string different from the to-be-displayed character string corresponding to the first display object, an emoticon, or a picture, and the another character string includes an abbreviation of the to-be-displayed character string corresponding to the first display object.

In this way, the length of the associated content may usually be less than the length of the to-be-displayed character string corresponding to the first display object, and therefore the length of the associated content is more likely to be less than or equal to the width of the effective display space.

With reference to the first aspect and the foregoing possible implementations, in another possible implementation, the first display object and the second display object correspond to a same associated display object group; and the electronic device stores a preset mapping relationship between an associated display object group and a plurality of display objects, or a first identifier corresponding to the first display object and a second identifier corresponding to the second display object have a preset association relationship.

In this way, the first display object and the second display object are associated display objects.

With reference to the first aspect and the foregoing possible implementations, in another possible implementation, the first display object and the second display object are display objects in a same dialog box.

In this way, display objects in a same dialog box belong to a same associated display object group. In other words, the display objects in the same dialog box are associated display objects.

According to a second aspect, an embodiment of this application provides an electronic device, including a display and one or more processors. The display is configured to display content based on an instruction of the one or more processors. The one or more processors are configured to: instruct the display to display a first screen, where the first screen includes a first display object and a second display object, and the first display object and the second display object on the first screen have a first positional relationship; in response to determining that a length of a to-be-displayed character string corresponding to the first display object is greater than a first width of the first display object on the first screen, determine to display the first display object and the second display object on a second screen, where the first display object and the second display object on the second screen have a second positional relationship, the second positional relationship is different from the first positional relationship, and a second width of the first display object corresponding to the second positional relationship is greater than the first width of the first display object corresponding to the first positional relationship; and instruct the display to perform displaying.

With reference to the second aspect, in a possible implementation, that the first display object and the second display object on the first screen have a first positional relationship includes: the first display object and the second display object on the first screen are arranged in parallel in a same horizontal direction. That the first display object and the second display object on the second screen have a second positional relationship includes: the first display object and the second display object on the second screen are not arranged in parallel in a same horizontal direction.

With reference to the second aspect and the foregoing possible implementation, in another possible implementation, that the first display object and the second display object on the second screen are not arranged in parallel in a same horizontal direction includes: the first display object and the second display object on the second screen are aligned in a same vertical direction; the first display object and the second display object on the second screen are arranged in a stepped shape in a vertical direction; the first display object and the second display object on the second screen are arranged in parallel in a same diagonal direction; or the first display object and the second display object on the second screen are arranged in different diagonal directions.

With reference to the second aspect and the foregoing possible implementations, in another possible implementation, on the second screen, a height and a width of the first display object are the same as those of the second display object.

With reference to the second aspect and the foregoing possible implementations, in another possible implementation, the processor is further configured to: determine a width of effective display space of an area in which the first display object is located on the first screen; and in response to determining that the length of the to-be-displayed character string corresponding to the first display object is less than or equal to the width of the effective display space, determine to display the first display object and the second display object on the second screen; or in response to determining that the length of the to-be-displayed character string corresponding to the first display object is greater than the width of the effective display space, decrease a font size of a to-be-displayed character string corresponding to a target display object, where the target display object is the first display object, or the target display object is the first display object and the second display object; and in response to determining that a length of the to-be-displayed character string corresponding to the first display object after the font size is decreased is less than or equal to the width of the effective display space, determine to display the first display object and the second display object on the second screen; or in response to determining that a length of the to-be-displayed character string corresponding to the first display object after the font size is decreased is greater than the width of the effective display space, and a font size of the to-be-displayed character string corresponding to the target display object after the font size is decreased is greater than a preset font size, continue decreasing the font size of the to-be-displayed character string corresponding to the target display object.

With reference to the second aspect and the foregoing possible implementations, in another possible implementation, the processor is further configured to: in response to determining that the length of the to-be-displayed character string corresponding to the first display object after the font size is decreased is greater than the width of the effective display space, and the font size of the to-be-displayed character string corresponding to the target display object after the font size is decreased is the preset font size, determine to display the first display object and the second display object on the second screen; or the processor is further configured to: in response to determining that the length of the to-be-displayed character string corresponding to the first display object after the font size is decreased is greater than the width of the effective display space, and the font size of the to-be-displayed character string corresponding to the target display object after the font size is decreased is the preset font size, replace the to-be-displayed character string corresponding to the first display object with associated content, where a length of the associated content is less than or equal to the width of the effective display space.

With reference to the second aspect and the foregoing possible implementations, in another possible implementation, the processor is further configured to: determine a width of effective display space of an area in which the first display object is located on the first screen; and in response to determining that the length of the to-be-displayed character string corresponding to the first display object is less than or equal to the width of the effective display space, determine to display the first display object and the second display object on the second screen; or in response to determining that the length of the to-be-displayed character string corresponding to the first display object is greater than the width of the effective display space, replace the to-be-displayed character string corresponding to the first display object with associated content, where a length of the associated content is less than or equal to the width of the effective display space.

With reference to the second aspect and the foregoing possible implementations, in another possible implementation, the associated content includes at least one of another character string different from the to-be-displayed character string corresponding to the first display object, an emoticon, or a picture, and the another character string includes an abbreviation of the to-be-displayed character string corresponding to the first display object.

With reference to the second aspect and the foregoing possible implementations, in another possible implementation, the first display object and the second display object correspond to a same associated display object group; and the electronic device stores a preset mapping relationship between an associated display object group and a plurality of display objects, or a first identifier corresponding to the first display object and a second identifier corresponding to the second display object have a preset association relationship.

According to a third aspect, an embodiment of this application provides an electronic device, including: one or more processors, one or more memories, and a display. The one or more memories and the display are coupled to the one or more processors. The one or more memories are configured to store computer program code, and the computer program code includes a computer instruction. When the one or more processors execute the computer instruction, the electronic device performs the display processing method in any one of the first aspect or the possible implementations of the first aspect. The display is configured to display content based on an instruction of the processor.

According to a fourth aspect, an embodiment of this application provides a computer storage medium, including a computer instruction. When the computer instruction is run on an electronic device, the electronic device is enabled to perform the display processing method in any one of the first aspect or the possible implementations of the first aspect.

According to a fifth aspect, an embodiment of this application provides a computer program product. When the computer program product is run on a computer, the computer is enabled to perform the display processing method in any one of the first aspect or the possible implementations of the first aspect.

For beneficial effects corresponding to the second aspect to the fifth aspect, refer to the first aspect. Details are not described herein again.

BRIEF DESCRIPTION OF THE DRAWINGS

FIG. 5 is a flowchart of a method according to an embodiment of this application;

FIG. 12 is a schematic diagram of another type of screen displaying according to an embodiment of this application;

DETAILED DESCRIPTION OF ILLUSTRATIVE EMBODIMENTS

Figure 1A:
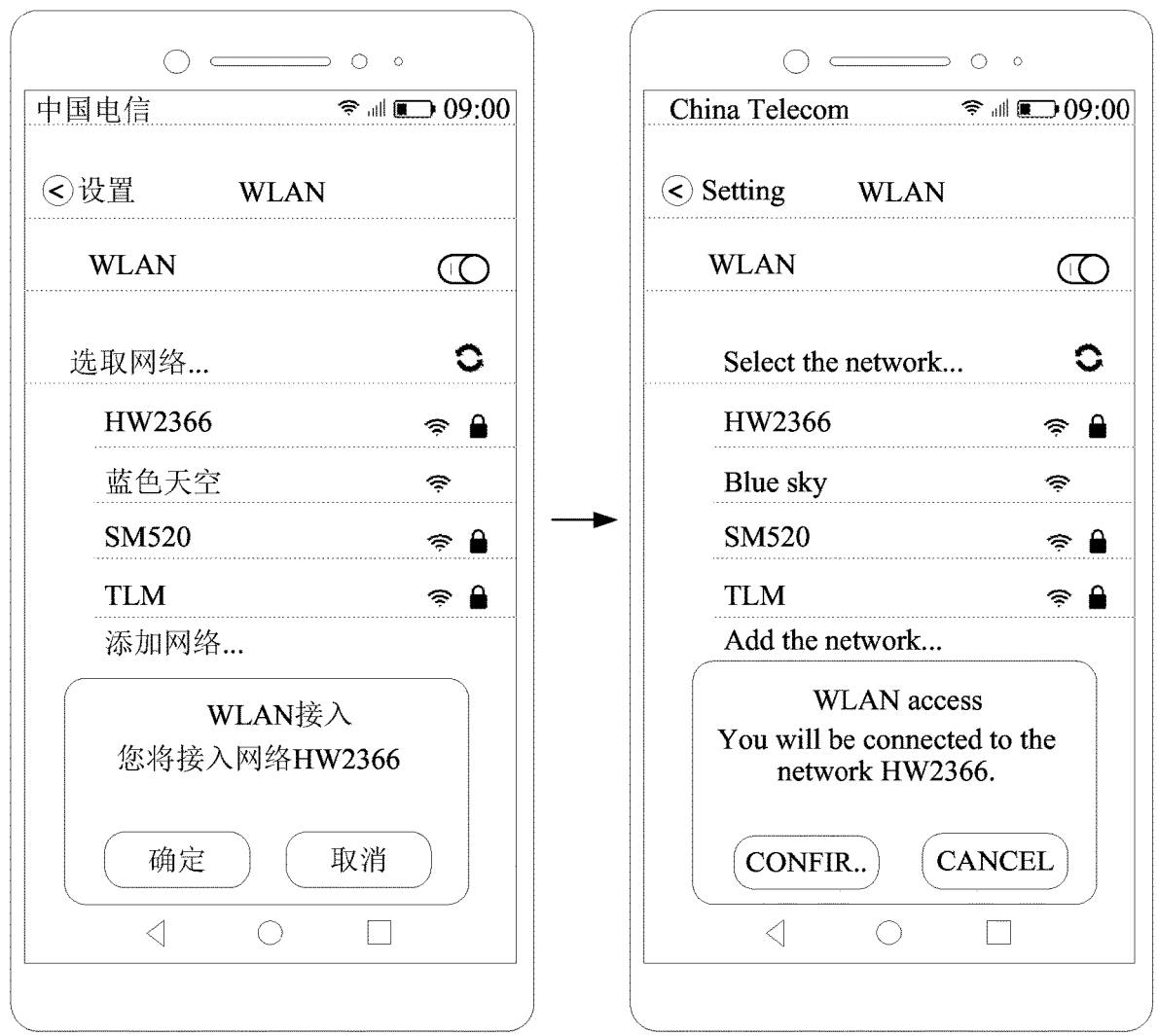
FIG. 1a is a schematic diagram of screen displaying in the prior art.
Figure 1B:
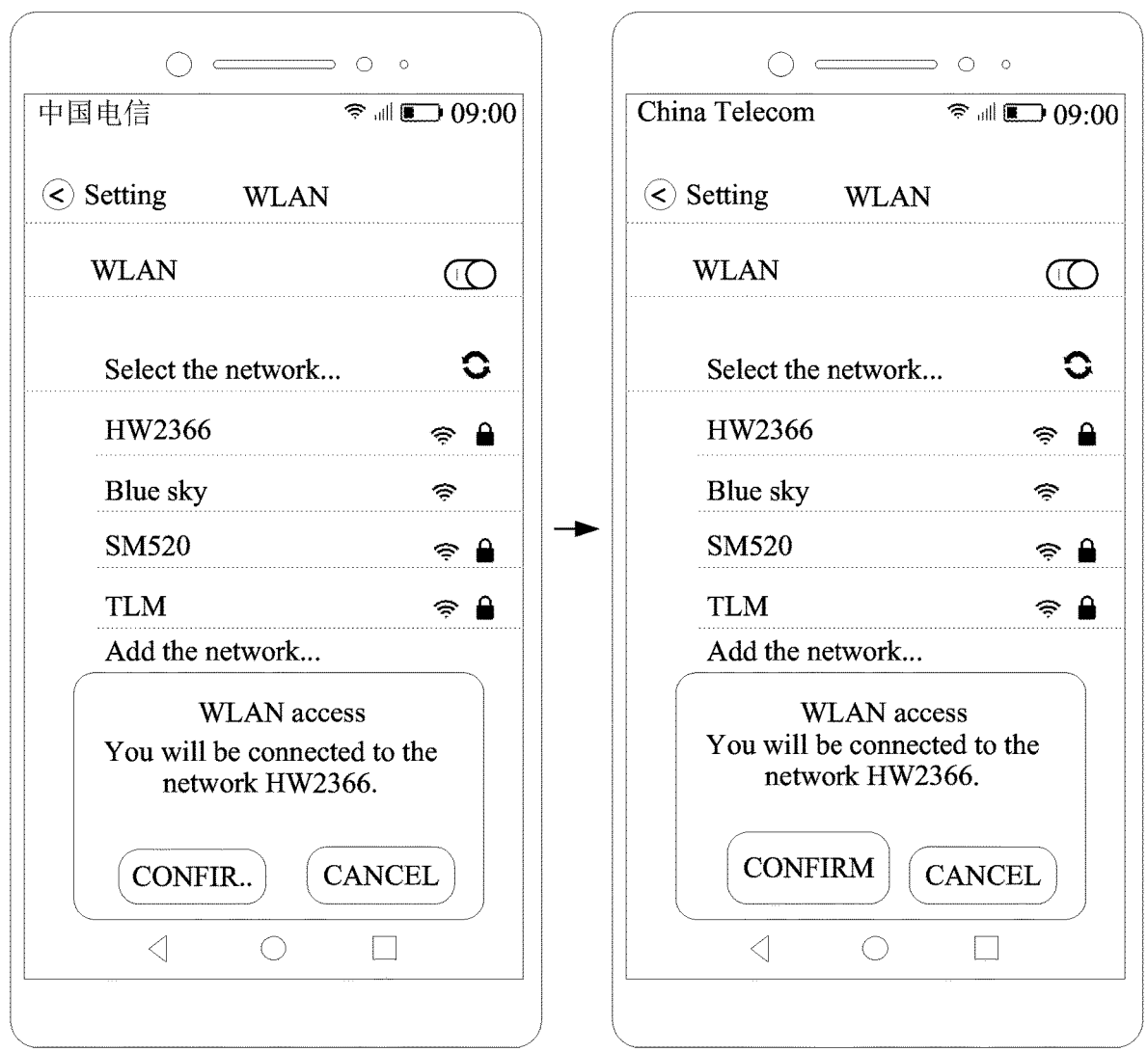
FIG. 1b is a schematic diagram of another type of screen displaying in the prior art.
Figure 2A:
FIG. 2a is a schematic diagram of screen displaying according to an embodiment of this application.
Figure 2B:
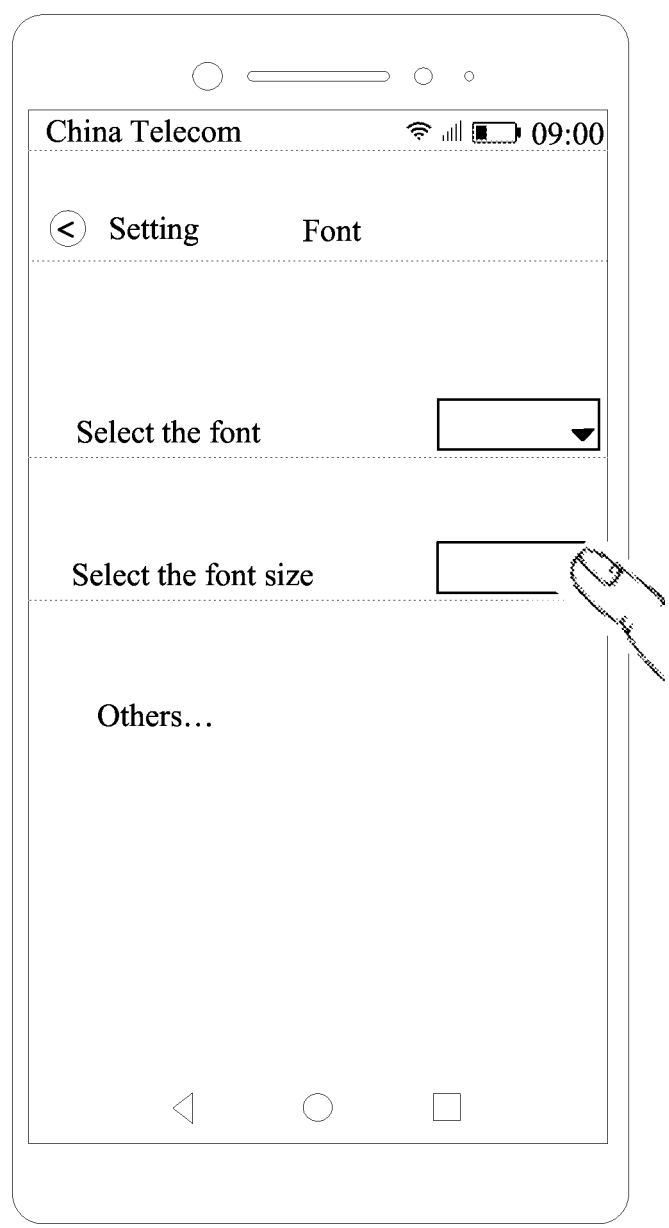
FIG. 2b is a schematic diagram of another type of screen displaying according to an embodiment of this application.

On a display screen, because a user switches a language type of displayed content on the screen, or changes a font size of displayed content on the screen, or because of some other reasons, specific content of a character string that is displayed in a display object is constantly refreshed. To be specific, the display object may have a new to-be-displayed character string that needs to be displayed. Therefore, compared with the originally displayed content in the display object, a length of the to-be-displayed character string corresponding to the display object may change, and a character displayed in the display object may also change. For example, when the length of the to-be-displayed character string corresponding to the display object becomes longer and a width of the display object is insufficient to display the entire to-be-displayed character string because the user switches the language type of the displayed content on the screen, as shown in FIG. 2a, or because the user increases the font size of the displayed content on the screen, as shown in FIG. 2b, or because of some other reasons, in the prior art, the to-be-displayed character string is wrapped to a new line in the display object to prevent the to-be-displayed character string from being truncated when displayed, and identifiability of the to-be-displayed character string after being wrapped to a new line in the display object is relatively poor. Embodiments of this application provide a display processing method. When a length of a to-be-displayed character string corresponding to a display object becomes longer, and a width of the display object is insufficient to display the to-be-displayed character string corresponding to the display object, the width of the display object is increased by automatically changing a positional relationship between the display object and another display object, so as to provide a greater width for displaying the to-be-displayed character string, and prevent, as far as possible, the to-be-displayed character string from being truncated when displayed.

In the embodiments of this application, the display object is a widget or a view used to display a character string, a picture, or other content on a screen of an electronic device, and may be, for example, a button or a key.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only a preset association relationship for describing associated objects and represents that three relationships may exist. For example, A and/or B may represent the following three cases: Only A exists, both A and B exist, and only B exists. In addition, in the description of the embodiments of this application, "a plurality of" means two or more than two.

It should be noted that, an electronic device provided in the embodiments of this application may be an electronic device that has a screen displaying function, and may be, for example, a device such as a terminal or a server. When the electronic device is a terminal, the electronic device may be specifically a device such as a mobile phone, a tablet computer, a notebook computer, an ultra-mobile personal computer (UMPC), a netbook, or a personal digital assistant (PDA).

Figure 3:
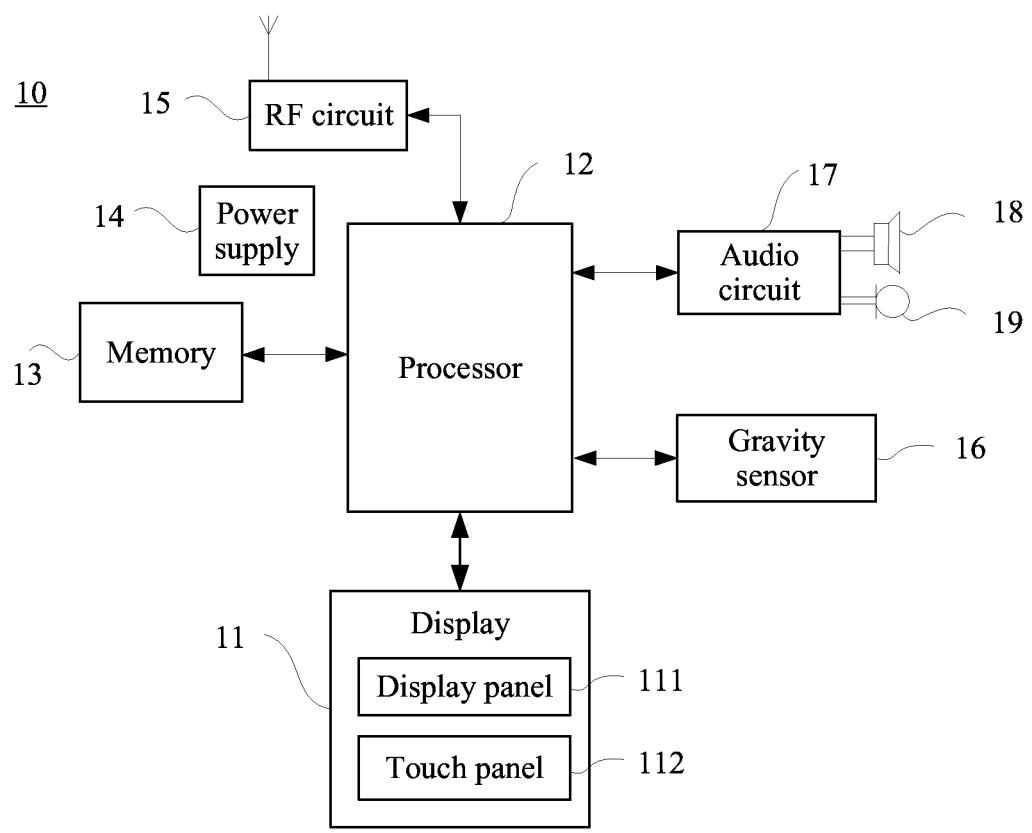
FIG. 3 is a schematic structural diagram of a mobile phone according to an embodiment of this application.

Specifically, in the embodiments of this application, the mobile phone is used as an example to describe the electronic device provided in the embodiments of this application. As shown in FIG. 3, a mobile phone 10 may include components such as a display 11, a processor 12, a memory 13, a power supply 14, a radio frequency (RF) circuit 15, a gravity sensor 16, an audio circuit 17, a loudspeaker 18, and a microphone 19. These components may be connected by using a bus, or may be directly connected. A person skilled in the art may understand that a structure of the mobile phone shown in FIG. 3 constitutes no limitation on the mobile phone, and the mobile phone may include more components than those shown in the figure, or combine some components, or have different component arrangements.

The display 11 may be configured to display information entered by a user or information provided for a user, and various menus of the mobile phone, and may further receive an input operation of the user. Specifically, the display 11 may include a display panel 11 and a touch panel 112.

The display panel in may be configured by using a liquid crystal display (LCD), an organic light-emitting diode (OLED), or the like.

The touch panel 112 may also be referred to as a touchscreen, a touch-sensitive screen, a touch control screen, or the like, and may collect a touch or non-touch operation (for example, an operation performed by the user on or near the touch panel 112 by using any proper object or accessory such as a finger or a stylus, or a motion sensing operation, where the operation includes operation types such as a single-point control operation and a multipoint control operation) performed by the user on or near the touch panel 112, and drive a corresponding connection apparatus according to a preset program. Optionally, the touch panel 112 may include two parts: a touch detection apparatus and a touch controller. The touch detection apparatus detects a touch orientation and a gesture of the user, detects a signal brought by a touch operation, and sends the signal to the touch controller. The touch controller receives a touch signal from the touch detection apparatus, converts the received touch signal into information that can be processed by the processor 12, and then sends the information to the processor 12, and can receive and execute a command sent by the processor 12. In addition, the touch panel 112 may be implemented by using a plurality of types such as a resistive type, a capacitive type, an infrared type, and a surface acoustic wave type. The touch panel 112 may also be implemented by using any technology to be developed in the future. This is not limited in the embodiments of this application.

Further, the touch panel 112 may cover the display panel 11. The user may perform, based on content displayed on the display panel 11 (the displayed content includes any one or a combination of the following: a soft keyboard, a virtual mouse, a virtual key, an icon, and the like), an operation on or near the touch panel 112 that covers the display panel 11. After detecting the operation on or near the touch panel 112, the touch panel 112 sends the operation to the processor 12 by using an input/output subsystem, to determine a user input, and then the processor 12 provides a corresponding visual output on the display panel 11 based on the user input and by using the input/output subsystem. In FIG. 3, the touch panel 112 and the display panel 11 are used as two independent components to implement input and output functions of the mobile phone. However, in some embodiments, the touch panel 112 and the display panel 11 may be integrated to implement the input and output functions of the mobile phone.

The processor 12 is a control center of the mobile phone 10, is connected to all parts of the entire mobile phone by using various interfaces and lines, and performs various functions of the mobile phone 10 and data processing by running or executing a software program and/or a module that are/is stored in the memory 13 and by invoking data stored in the memory 13, to perform overall monitoring on the mobile phone 10. During specific implementation, in an embodiment, the processor 12 may include one or more processing units, and the processor 12 may integrate an application processor and a modem processor. The application processor mainly processes an operating system, a user interface, an application program, and the like, and the modem processor mainly processes wireless communication. It may be understood that, alternatively, the modem processor may not be integrated into the processor 12.

The memory 13 may be configured to store data, a software program, and a module, and may be a volatile memory, for example, a random access memory (RAM); or may be a nonvolatile memory, for example, a read-only memory (ROM), a flash memory, a hard disk drive (HDD), or a solid-state drive (SSD); or may be a combination of the foregoing types of memories.

The power supply 14 may be a battery, and is logically connected to the processor 12 by using a power management system, to implement functions such as charging management, discharging management, and power consumption management by using the power management system.

The RF circuit 15 may be configured to: receive and send a signal in an information receiving and sending process or in a call process, and particularly, send received information to the processor 12 for processing. In addition, the RF circuit 15 sends a signal generated by the processor 12. Generally, the RF circuit includes but is not limited to an antenna, at least one amplifier, a transceiver, a coupler, a low noise amplifier (LNA), a duplexer, and the like. In addition, the RF circuit 15 may further communicate with a network and another device through wireless communication.

The gravity sensor 16 may detect a value of an acceleration of the mobile phone in each direction (generally, three axes), may detect a value and a direction of gravity when the mobile phone is stationary, and may be configured to recognize a mobile phone posture application (for example, switching between landscape and portrait screens, a related game, and magnetometer posture calibration), a vibration recognition related function (for example, a pedometer or a knock), and the like. It should be noted that the mobile phone 10 may further include other sensors such as a pressure sensor, a light sensor, a gyroscope, a barometer, a hygrometer, a thermometer, and an infrared sensor. Details are not described herein.

The audio circuit 17, the loudspeaker 18, and the microphone 19 may provide an audio interface between the user and the mobile phone 10. The audio circuit 17 may convert received audio data into an electrical signal and transmit the electrical signal to the loudspeaker 18. The loudspeaker 18 converts the electrical signal into a sound signal and outputs the sound signal. the microphone 19 converts a collected sound signal into an electrical signal. The audio circuit 17 receives the electrical signal and converts the electrical signal into audio data, and then outputs the audio data to the RF circuit 15, so as to send the audio data to, for example, another mobile phone. Alternatively, the audio data is output to the processor 12 for further processing.

Although not shown in the figure, the mobile phone 10 may further include functional modules such as a Wireless Fidelity (Wi-Fi) module, a Bluetooth module, and a camera. Details are not described herein.

Specifically, with reference to the mobile phone 10 shown in FIG. 3, the following describes in detail the display processing method and the electronic device that are provided in the embodiments of this application. It should be noted that the electronic device provided in the embodiments of this application may alternatively be any electronic device other than the mobile phone shown in FIG. 3.

An embodiment of this application provides a display processing method that may be applied to a scenario in which a mobile phone displays a first display object and a second display object on a first screen based on a first positional relationship. For example, for a schematic diagram of the first screen, refer to FIG. 4a, which includes a first display object 31 and a second display object 32. Referring to FIG. 5, the method may mainly include the following steps.

200. In response to determining that a length of a to-be-displayed character string corresponding to the first display object is greater than a first width of the first display object on the first screen, the mobile phone stops displaying the first screen.

201. The mobile phone displays the first display object and the second display object on a second screen, where the first display object and the second display object on the second screen have a second positional relationship, the second positional relationship is different from the first positional relationship, and a second width of the first display object corresponding to the second positional relationship is greater than the first width.

That the mobile phone displays the first display object may include: displaying a frame of the first display object, and displaying, within the frame of the first display object, the to-be-displayed character string corresponding to the first display object or associated content of the to-be-displayed character string corresponding to the first display object. That the mobile phone displays the second display object may include: displaying a frame of the second display object, and displaying, within the frame of the second display object, a to-be-displayed character string corresponding to the second display object. The first display object and the second display object may belong to a same display object type. For example, both the first display object and the second display object may be of a button type. Alternatively, the first display object and the second display object may belong to different display object types. For example, the first display object may be of a button type, and the second display object may be of a key type.

When the character string displayed in the first display object changes because a user switches a language type, as shown in FIG. 2a, or a user changes a font size of content displayed on the screen, as shown in FIG. 2b, or because of some other reasons, the first display object compares a new to-be-displayed character string with the character string displayed in the first display object on the first screen. The length of the to-be-displayed character string corresponding to the first display object may become longer. For example, referring to FIG. 4b and FIG. 4c, when the content displayed on the screen in FIG. 4a changes from Chinese to English, the first display object 31 changes a to-be-displayed character string to an English expression "CONFIRM" of "确定". To be specific, the to-be-displayed character string corresponding to the first display object 31 is "CONFIRM". Compared with the character string "确定" that is previously displayed by the first display object 31 on the first screen, a length of the to-be-displayed character string "CONFIRM" becomes longer.

Figure 4A:
FIG. 4a is a schematic diagram of another type of screen displaying according to an embodiment of this application.
Figure 4B:
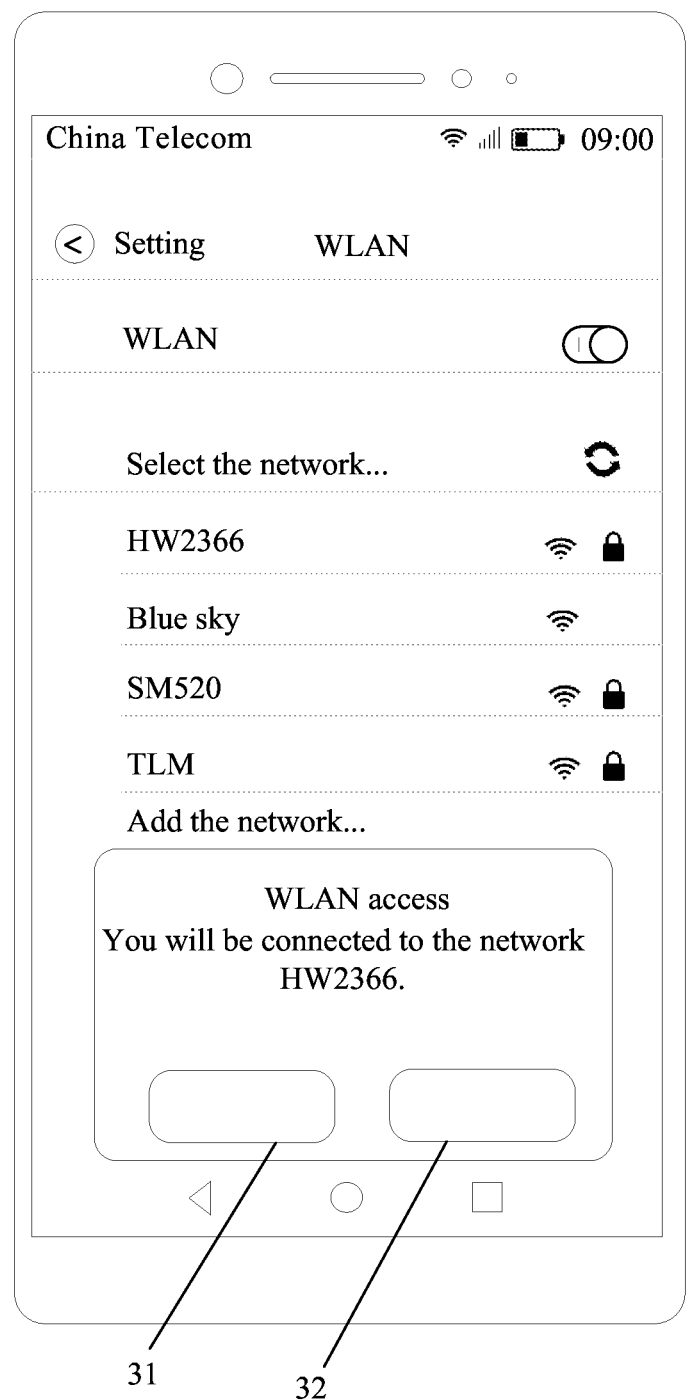
FIG. 4b is a schematic diagram of another type of screen displaying according to an embodiment of this application.
Figure 4C:
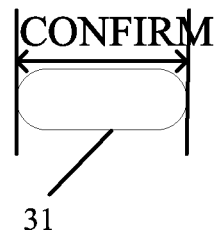
FIG. 4c is a schematic diagram of comparison between a length of a to-be-displayed character string and a width of a first display object according to an embodiment of this application.
Figure 4D:
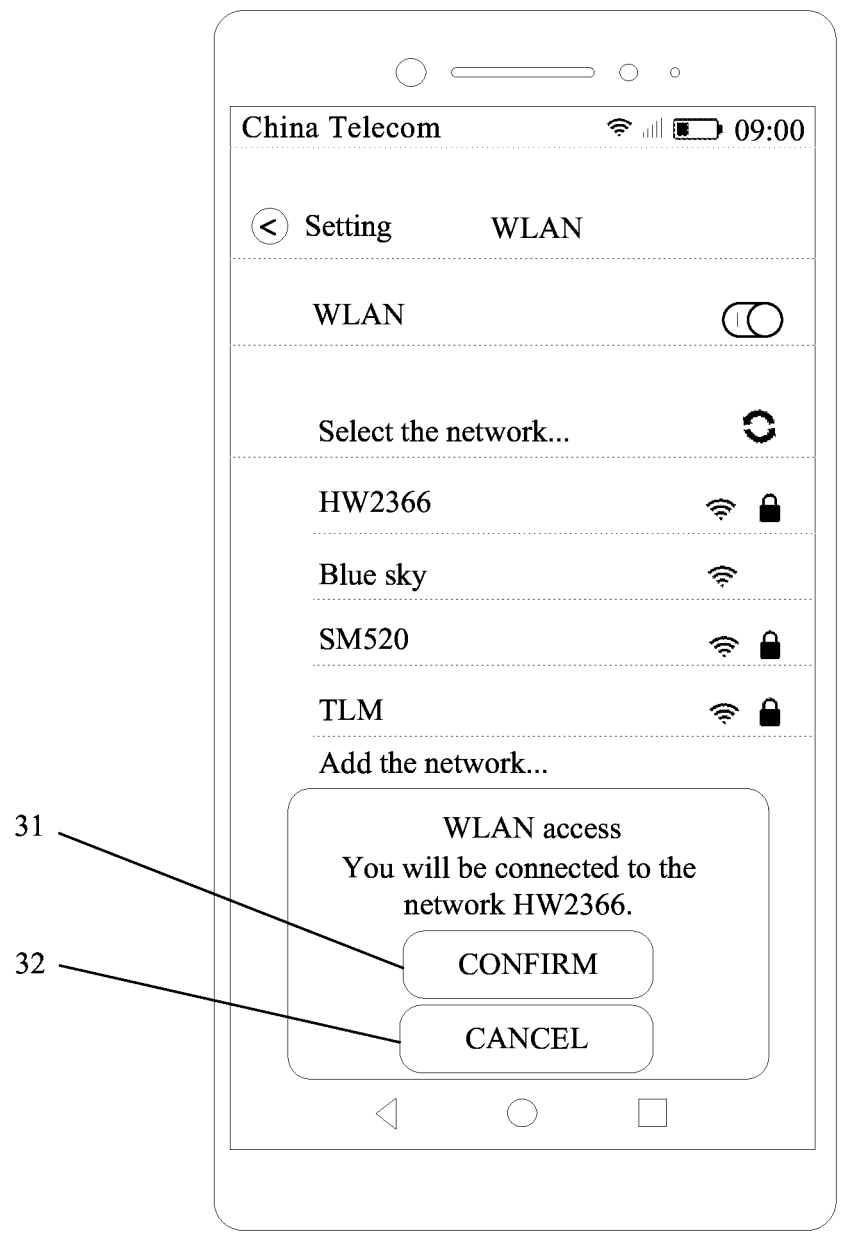
FIG. 4d is a schematic diagram of another type of screen displaying according to an embodiment of this application.

When the mobile phone determines that the length of the to-be-displayed character string is greater than the first width of the first display object on the first screen, the mobile phone may change, based on space that can be occupied by the display object on the first screen, the first positional relationship between the first display object and the second display object on the first screen to the second positional relationship that is different from the first positional relationship, so that the second width of the first display object corresponding to the second positional relationship is greater than the first width of the first display object corresponding to the first positional relationship on the first screen. For example, the mobile phone may change a first positional relationship between the first display object 31 and the second display object 32 in FIG. 4a to a second positional relationship between the first display object 31 and the second display object 32 in FIG. 4d. A second width of the first display object 31 in FIG. 4d is greater than a first width of the first display object 31 in FIG. 4a. In this way, the mobile phone may increase a width of the first display object by adjusting a positional relationship between the first display object and the second display object, thereby providing a greater width for displaying the to-be-displayed character string corresponding to the first display object, ensuring that the to-be-displayed character string can be entirely displayed in one line as far as possible, and preventing the to-be-displayed character string from being truncated when displayed.

In addition, in the solution provided in this embodiment of this application, because the to-be-displayed character string is not wrapped to a new line in the first display object, identifiability of the to-be-displayed character string is not affected, unlike the prior art, and appearances of the display object and the screen, and user experience are not affected due to deformation of the display object, unlike the prior art.

That the mobile phone determines whether the length of the to-be-displayed character string corresponding to the first display object is greater than the first width of the first display object on the first screen may include: the mobile phone determines a first size corresponding to the to-be-displayed character string corresponding to the first display object; the mobile phone determines a second size corresponding to the first width of the first display object on the first screen; and if the first size is greater than the second size, the mobile phone may determine that the length of the to-be-displayed character string corresponding to the first display object is greater than the first width of the first display object on the first screen. The first size and the second size may be represented by using a quantity of pixels.

In another possible implementation, that the mobile phone determines whether the length of the to-be-displayed character string corresponding to the first display object is greater than the first width of the first display object on the first screen may include: the mobile phone determines a first quantity of characters included in the to-be-displayed character string corresponding to the first display object; the mobile phone determines, based on resolution, a second quantity of characters that can be accommodated by the first width of the first display object on the first screen; and if the first character quantity is greater than the second character quantity, the mobile phone determines that the length of the to-be-displayed character string corresponding to the first display object is greater than the first width of the first display object on the first screen. Different resolution of the mobile phone leads to a different second quantity of characters that can be accommodated by the width of the first display object on the first screen.

Figure 6A:
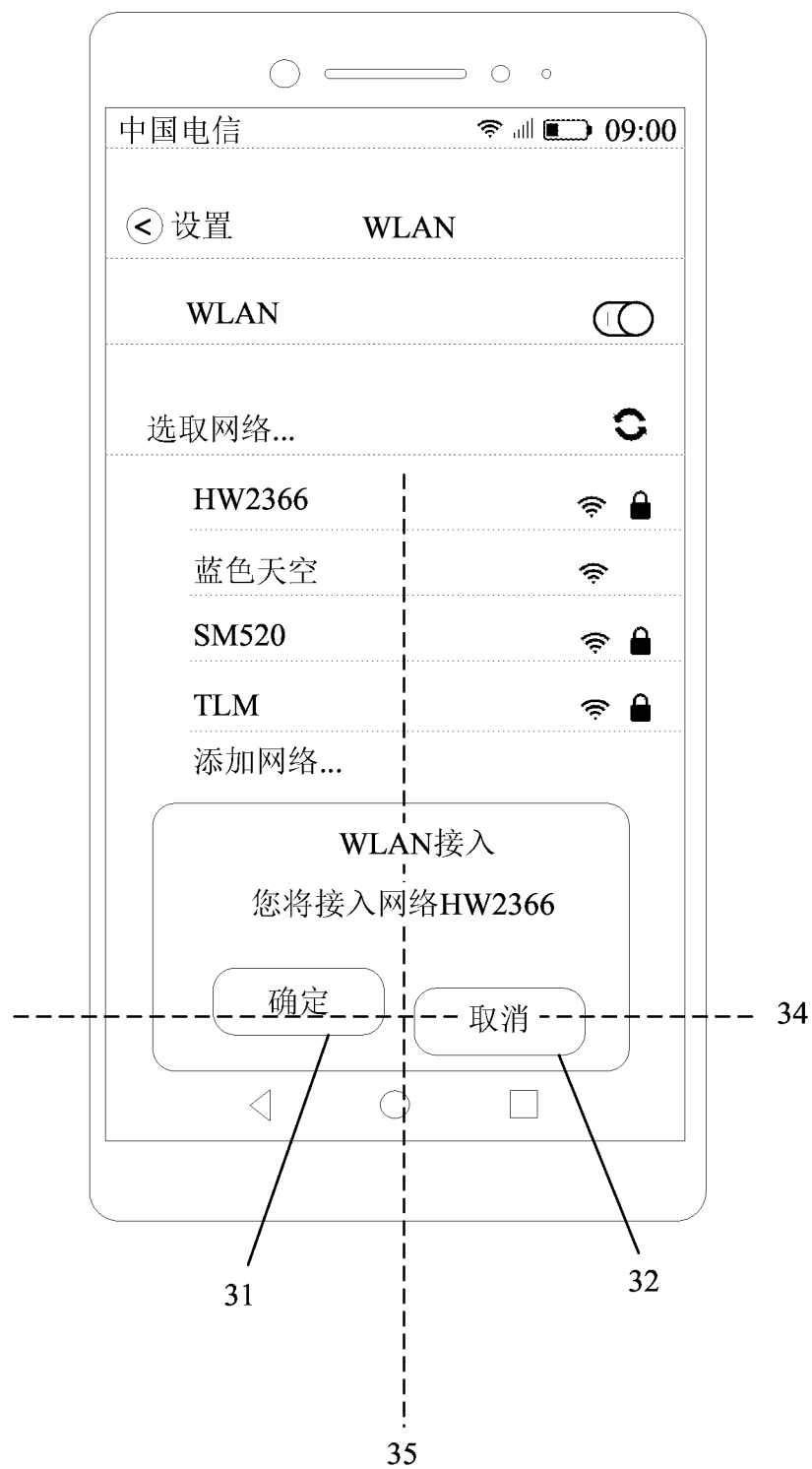
FIG. 6a is a schematic diagram of another type of screen displaying according to an embodiment of this application.

In this embodiment of this application, that the first display object and the second display object on the first screen have the first positional relationship may include: the first display object and the second display object on the first screen are arranged in parallel in a same horizontal direction. In this way, the first display object and the second display object are arranged in parallel, and an area corresponding to a height of the first display object and an area corresponding to a height of the second display object overlap in a vertical direction. For example, for a schematic diagram of the first display object 31 and the second display object 32 that are arranged in parallel in a same horizontal direction, refer to FIG. 4a or FIG. 6a. In FIG. 4a, the first display object 31 and the second display object 32 are aligned in a same horizontal direction. In FIG. 6a, 34 represents a horizontal direction, and 35 represents a vertical direction.

When the first display object and the second display object are arranged in parallel in a same horizontal direction, because the second display object is also disposed in the same horizontal direction, the width of the first display object is relatively small due to a limitation of a width of the second display object. As a result, the to-be-displayed character string is easily truncated when displayed.

That the first display object and the second display object on the second screen have a second positional relationship may include: the first display object and the second display object on the second screen are not arranged in parallel in a same horizontal direction. In this way, the second positional relationship does not meet at least one of the following: parallel arrangement of the first display object and the second display object; and overlapping of the area corresponding to the height of the first display object and the area corresponding to the height of the second display object in the vertical direction.

When the first display object and the second display object are not arranged in parallel in a same horizontal direction, because impact of the width of the second display object on the width of the first display object may be reduced or avoided, the width of the first display object may be increased, thereby accommodating more content of the to-be-displayed character string, and preventing, as far as possible, the to-be-displayed character string corresponding to the first display object from being truncated when displayed.

For example, referring to FIG. 4d, that the first display object 31 and the second display object 32 on the second screen are not arranged in parallel in a same horizontal direction may include: the first display object 31 and the second display object 32 on the second screen are aligned in a same vertical direction.

Figure 6B:
FIG. 6b is a schematic diagram of another type of screen displaying according to an embodiment of this application.

For example, referring to FIG. 6b, that the first display object 31 and the second display object 32 on the second screen are not arranged in parallel in a same horizontal direction may include: the first display object 31 and the second display object 32 on the second screen are arranged in a stepped shape in a vertical direction.

Figure 6C:
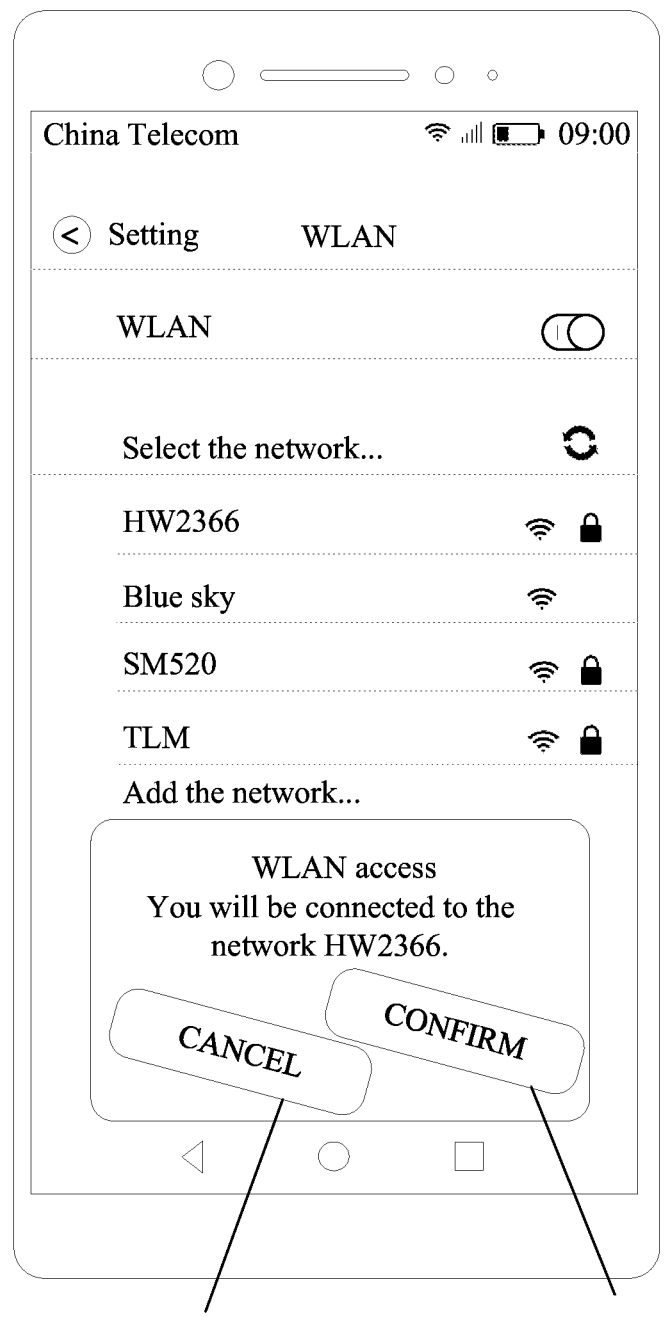
FIG. 6c is a schematic diagram of another type of screen displaying according to an embodiment of this application.

For example, referring to FIG. 6c, that the first display object 31 and the second display object 32 on the second screen are not arranged in parallel in a same horizontal direction may include: the first display object 31 and the second display object 32 on the second screen are arranged in parallel in a same diagonal direction.

Figure 6D:
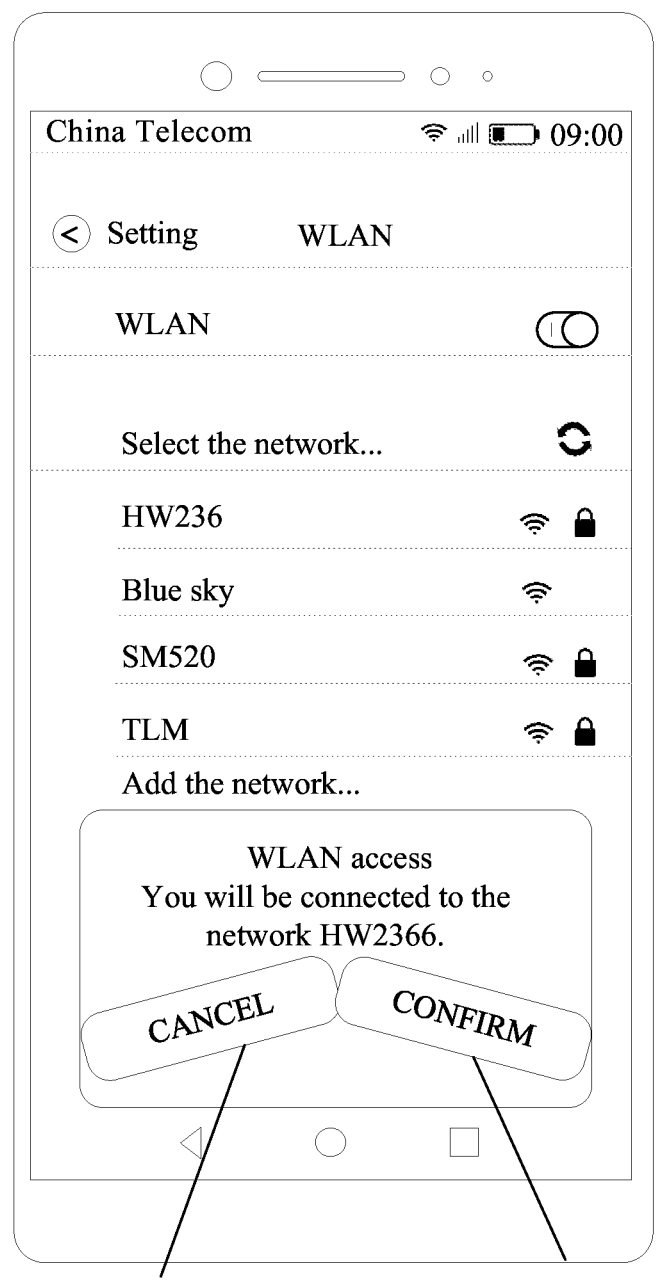
FIG. 6d is a schematic diagram of another type of screen displaying according to an embodiment of this application.

For example, referring to FIG. 6d, that the first display object 31 and the second display object 32 on the second screen are not arranged in parallel in a same horizontal direction may include: the first display object 31 and the second display object 32 on the second screen are arranged in different diagonal directions.

Compared with the case shown in FIG. 4a or FIG. 6a, when the first display object 31 and the second display object 32 have positional relationships shown in FIG. 4d and FIG. 6b to FIG. 6d, a width of the second display object 32 has no impact or relatively slight impact on a width of the first display object 31. Therefore, the width of the first display object 31 may be relatively great, and may provide a greater width for displaying the to-be-displayed character string, preventing, as far as possible, the to-be-displayed character string from being truncated when displayed.

In addition, in this embodiment of this application, on the second screen, widths of the first display object and the second display object may be different. Alternatively, in another implementation, on the second screen, a height and a width of the first display object are the same as those of the second display object, that is, the first display object and the second display object may keep a same size. This can better meet an aesthetic habit of the user, thereby improving user experience. This case is used as an example for description in this embodiment of this application.

Figure 7A:
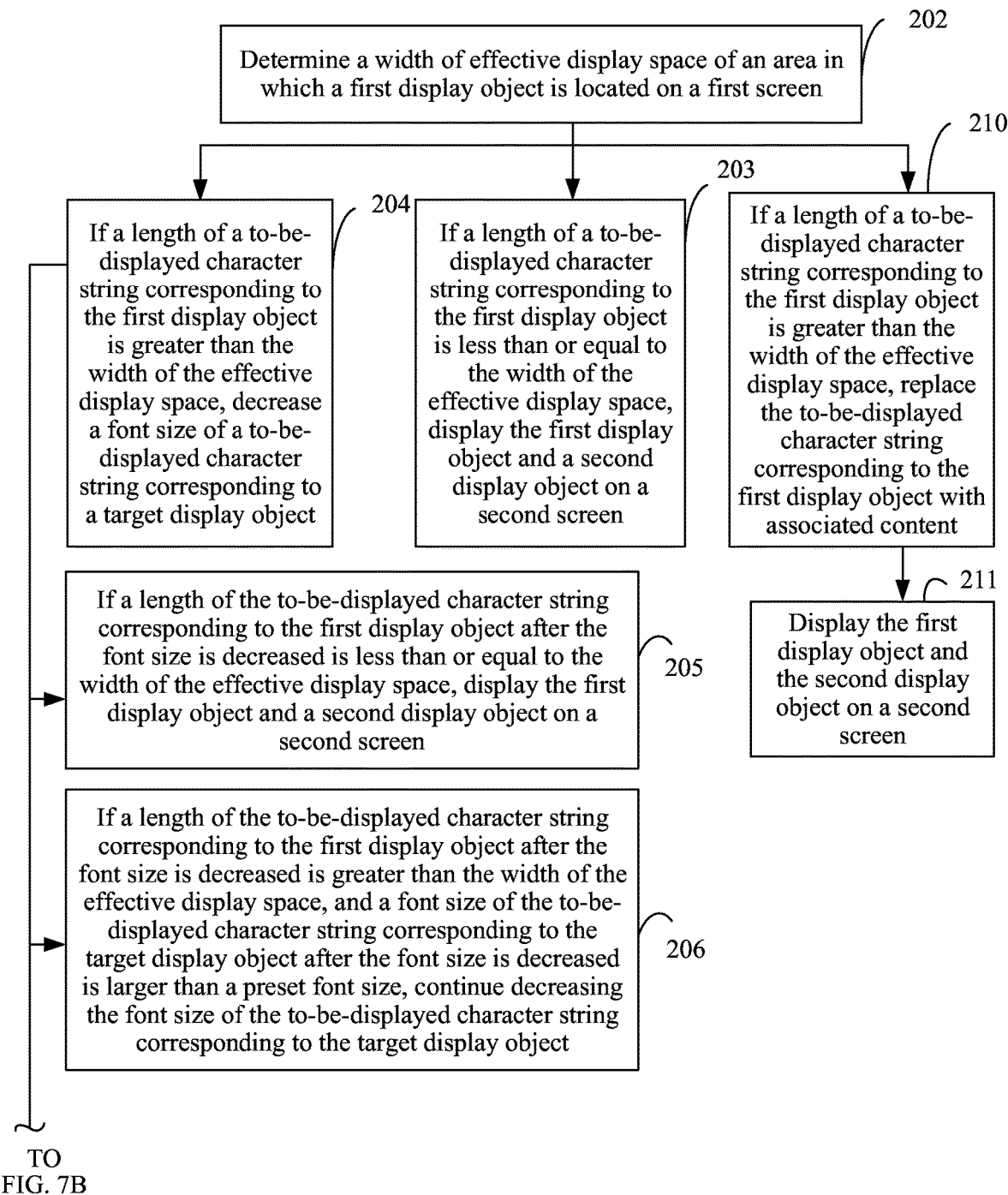
FIG. 7a and FIG. 7b are a flowchart of another method according to an embodiment of this application.
Figure 7B:
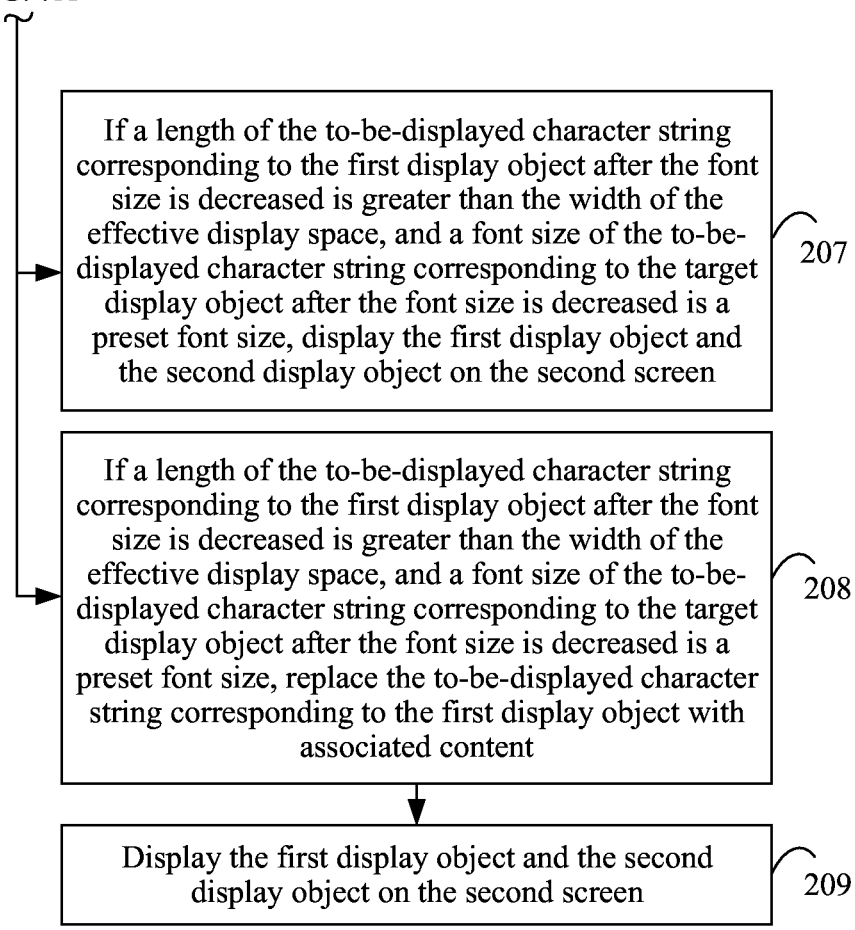

Specifically, referring to FIG. 7a and FIG. 7b, in step 201, that the mobile phone displays the first display object and the second display object on a second screen may include the following steps.

202. The mobile phone determines a width of effective display space of an area in which the first display object is located on the first screen.

Figure 8A:
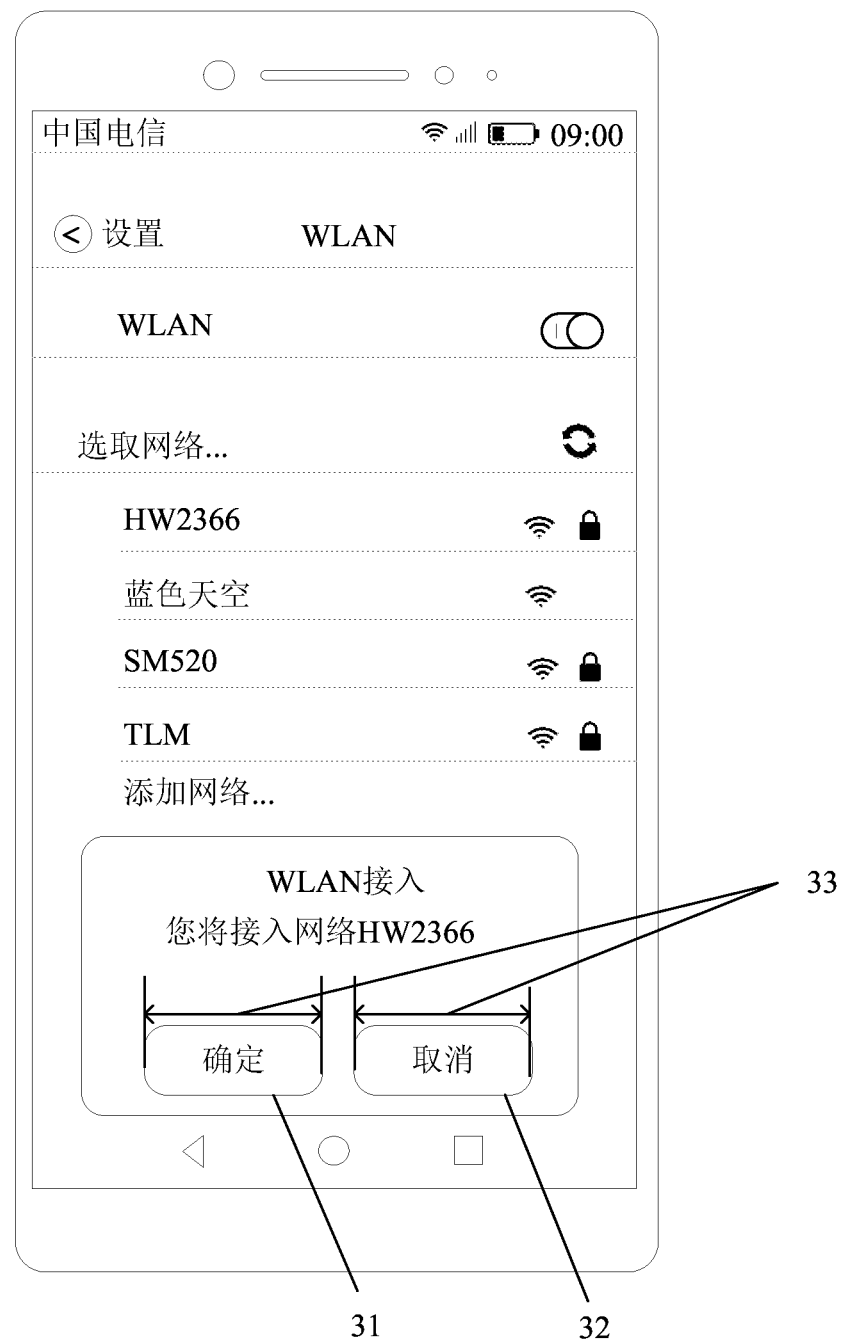
FIG. 8a is a schematic diagram of a width of effective display space according to an embodiment of this application.

In a case, the width of the effective display space of the area in which the first display object is located on the first screen may include a sum of the width of the first display object and the width of the second display object on the first screen. For example, as shown in FIG. 4a, a width 33 of effective display space of an area in which the first display object is located on the first screen may be shown in FIG. 8a.

In another case, the width of the effective display space of the area in which the first display object is located on the first screen may include a sum of the width of the first display object, the width of the second display object, a gap between the first display object and a screen boundary, and a gap between the second display object and the screen boundary on the first screen. For example, as shown in FIG. 4a, a width 33 of effective display space of an area in which the first display object 31 is located on the first screen may be shown in FIG. 8b.

In another case, the width of the effective display space of the area in which the first display object is located on the first screen may include widths of all effective display space in a horizontal direction corresponding to the height of the first display object on the first screen. For example, as shown in FIG. 4a, a width 33 of effective display space of an area in which the first display object 31 is located on the first screen may be shown in FIG. 8c.

Figure 8B:
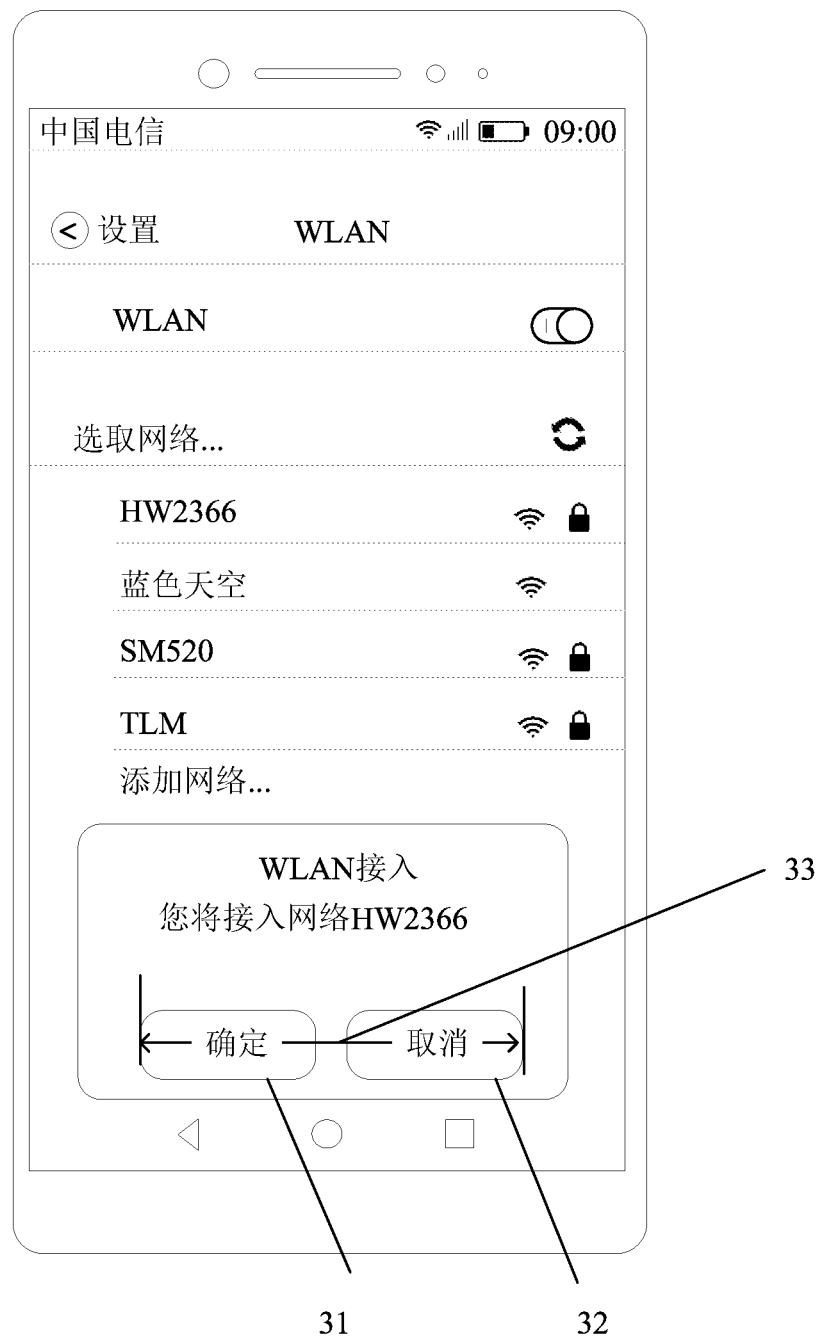
FIG. 8b is a schematic diagram of a width of another type of effective display space according to an embodiment of this application.
Figure 8C:
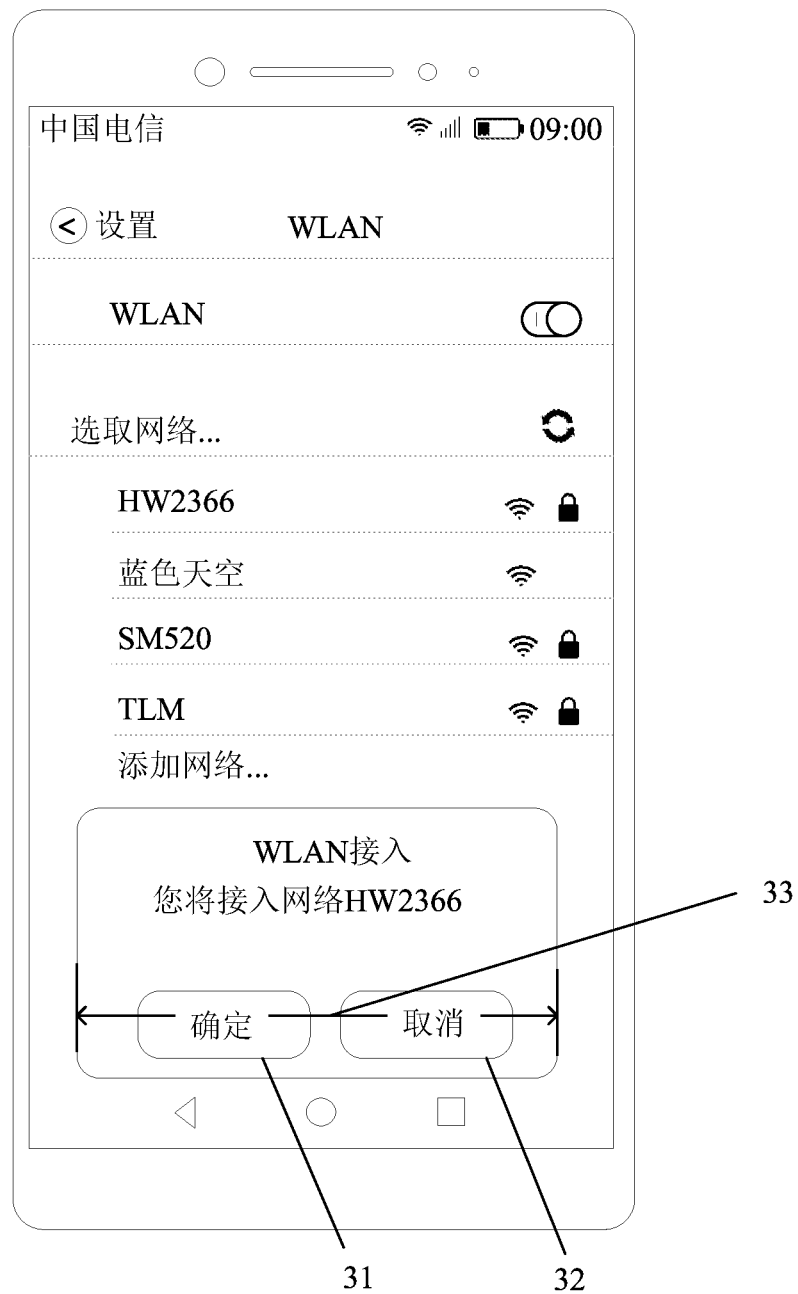
FIG. 8c is a schematic diagram of a width of another type of effective display space according to an embodiment of this application.

Compared with effective display space in FIG. 8b, a width of effective display space in FIG. 8c further includes a gap between the first display object 31 and a screen boundary, and a gap between the second display object 32 and the screen boundary.

It should be noted that, compared with the first width of the first display object on the first screen, when the mobile phone displays the first display object on the second screen, because the impact of the width of the second display object on the width of the first display object is reduced, the width of the first display object on the second screen is increased, and an increased length of the first display object is less than or equal to the width of the effective display space. Therefore, the mobile phone may display, by performing the following steps 203 to 211, the first display object and the second display object on the second screen based on a size relationship between the length of the to-be-displayed character string corresponding to the first display object and the width of the effective display space.

203. If the length of the to-be-displayed character string corresponding to the first display object is less than or equal to the width of the effective display space, the mobile phone displays the first display object and the second display object on the second screen.

When the length of the to-be-displayed character string corresponding to the first display object is less than or equal to the width of the effective display space, the length of the to-be-displayed character string corresponding to the first display object may be less than or equal to an increased width of the first display object, the increased width of the first display object may possibly accommodate the entire to-be-displayed character string corresponding to the first display object, and when displayed, the to-be-displayed character string corresponding to the first display object is not truncated by the frame of the first display object. In this case, the mobile phone may display the first display object and the second display object on the second screen. In addition, content displayed within the frame of the first display object is the to-be-displayed character string corresponding to the first display object.

For example, referring to FIG. 4d, a length of the to-be-displayed character string corresponding to the first display object 31 is less than the width of the first display object 31, and therefore the to-be-displayed character string corresponding to the first display object is not truncated when displayed.

Further, in step 201, that the mobile phone displays the first display object and the second display object on a second screen may further include the following steps.

204. If the length of the to-be-displayed character string corresponding to the first display object is greater than the width of the effective display space, the mobile phone decreases a font size of a to-be-displayed character string corresponding to a target display object.

The target display object includes the first display object. The target display object may be specifically the first display object, or the target display object may be specifically the first display object and the second display object.

Because the increased width of the first display object is less than or equal to the width of the effective display space, if the length of the to-be-displayed character string corresponding to the first display object is greater than the width of the effective display space, the length of the to-be-displayed character string corresponding to the first display object is definitely greater than the increased width of the first display object. To be specific, the increased width of the first display object still cannot accommodate the entire to-be-displayed character string corresponding to the first display object, and when displayed, the to-be-displayed character string corresponding to the first display object is still truncated by the frame of the first display object.

Figure 9A:
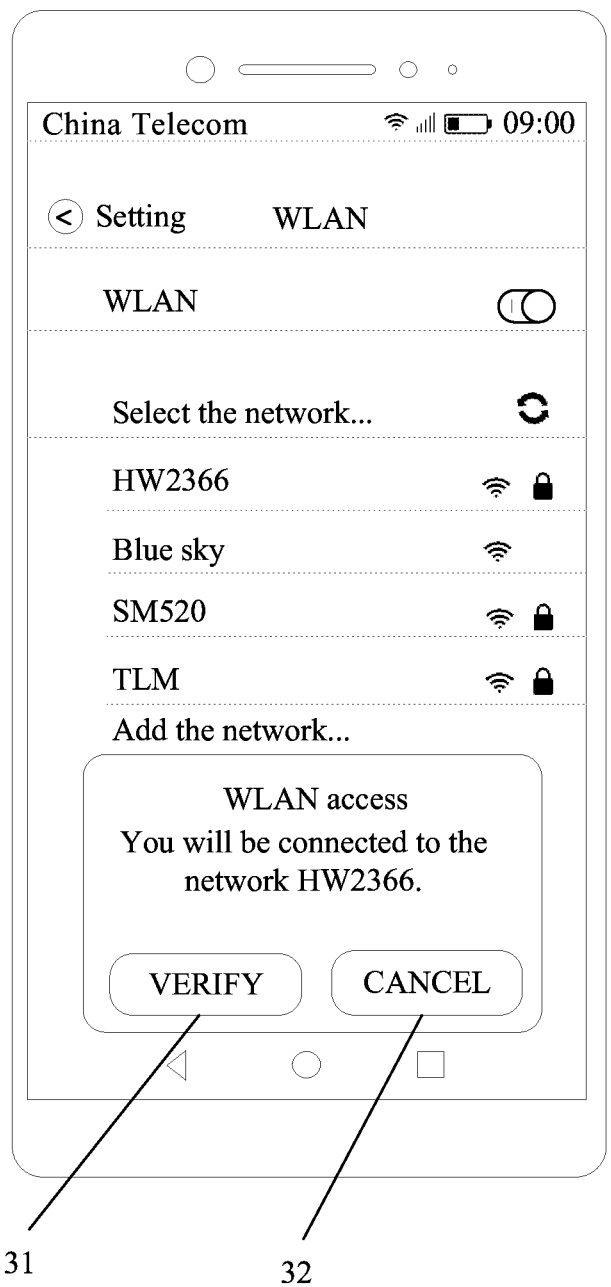
FIG. 9a is a schematic diagram of another type of screen displaying according to an embodiment of this application.
Figure 9B:
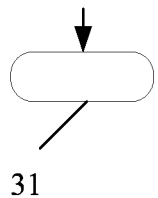
FIG. 9b is a schematic diagram of a first display object and a to-be-displayed character string according to an embodiment of this application.
Figure 9C:
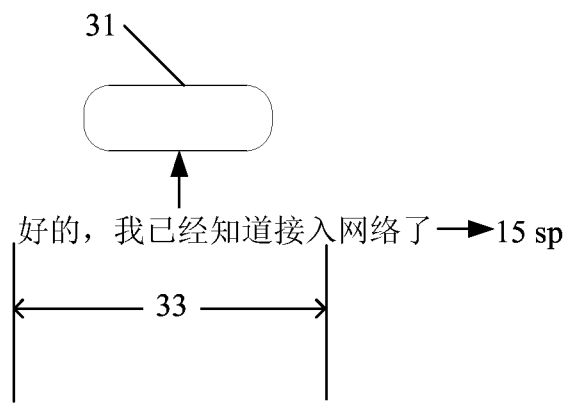
FIG. 9c is a schematic diagram of comparison between a length of a to-be-displayed character string and a width of effective display space according to an embodiment of this application.

For example, referring to FIG. 9a, due to a change of a language type of the content on the screen, the to-be-displayed character string corresponding to the first display object 31 on the first screen is "VERIFY"; referring to FIG. 9b, the to-be-displayed character string corresponding to the first display object 31 is "好的, 我已经知道 接入网络了". Referring to FIG. 9c, the length of the to-be-displayed character string corresponding to the first display object 31 is greater than the width 33 of the effective display space.

Therefore, the mobile phone may decrease the length of the to-be-displayed character string corresponding to the first display object by decreasing a font size of the to-be-displayed character string corresponding to the first display object, or decreasing a font size of the to-be-displayed character string corresponding to the first display object and a font size of the to-be-displayed character string corresponding to the second display object, so that an increased width of the first display object can accommodate more content of the to-be-displayed character string corresponding to the first display object. This prevents, as far as possible, the to-be-displayed character string corresponding to the first display object from being truncated by the frame of the first display object when the to-be-displayed character string is displayed.

In addition, in step 204, when the target display object includes the first display object and the second display object, the mobile phone may decrease both the font size of the to-be-displayed character string corresponding to the first display object and the font size of the to-be-displayed character string corresponding to the second display object, so that the font sizes of the to-be-displayed character strings corresponding to the first display object and the second display object keep consistent. In this way, after the first display object and the second display object are displayed on the second screen, the second screen in which the first display object and the second display object are located is more elegant, and user experience can be improved.

Figure 9D:
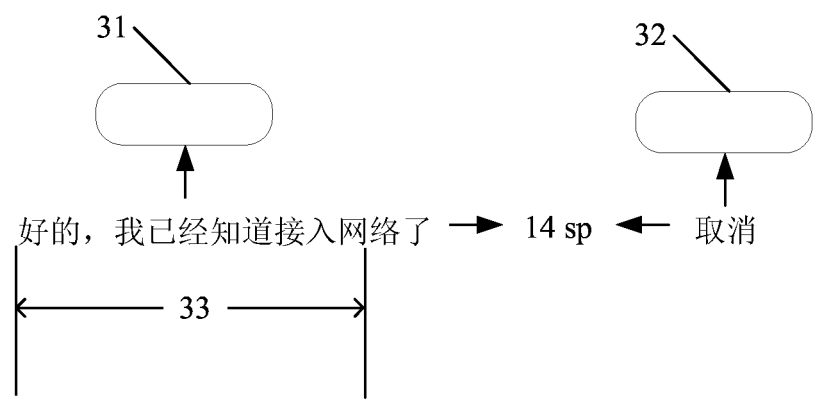
FIG. 9d is another schematic diagram of comparison between a length of a to-be-displayed character string and a width of effective display space according to an embodiment of this application.

For example, when a font size of a first to-be-displayed character string corresponding to the first display object 31 in FIG. 9c is 15 sp, referring to FIG. 9d, the mobile phone may decrease the font size of the to-be-displayed character string corresponding to the first display object 31 and a font size of a to-be-displayed character string corresponding to the second display object 32 to 14 sp.

205. If a length of the to-be-displayed character string corresponding to the first display object after the font size is decreased is less than or equal to the width of the effective display space, the mobile phone displays the first display object and the second display object on the second screen.

Because the target display object includes the first display object or includes the first display object and the second display object, in step 204, when the font size of the to-be-displayed character string corresponding to the target display object is decreased, the font size of the to-be-displayed character string corresponding to the first display object is decreased in step 204. When the length of the to-be-displayed character string corresponding to the first display object after the font size is decreased is less than or equal to the width of the effective display space, a length of the to-be-displayed character string corresponding to the first display object after the font size is decreased may possibly be less than or equal to the increased width of the first display object. To be specific, the increased first display object may accommodate the entire to-be-displayed character string corresponding to the first display object, and therefore the mobile phone can display the first display object and the second display object on the second screen. In this way, when displayed, the to-be-displayed character string corresponding to the first display object is not truncated by the frame of the first display object. In addition, content displayed within the frame of the first display object is the to-be-displayed character string corresponding to the first display object.

206. If a length of the to-be-displayed character string corresponding to the first display object after the font size is decreased is greater than the width of the effective display space, and a font size of the to-be-displayed character string corresponding to the target display object after the font size is decreased is greater than a preset font size, the mobile phone continues decreasing the font size of the to-be-displayed character string corresponding to the target display object.

After the font size of the to-be-displayed character string corresponding to the first display object is decreased in step 204, if the length of the to-be-displayed character string corresponding to the first display object after the font size is decreased is greater than the width of the effective display space, the length of the to-be-displayed character string corresponding to the first display object after the font size is decreased is definitely greater than the increased width of the first display object. The width of the first display object cannot accommodate the entire to-be-displayed character string corresponding to the first display object. In this case, if the mobile phone directly displays the first display object on the second screen, when displayed, the to-be-displayed character string corresponding to the first display object is truncated by the frame of the first display object.

Therefore, in this case, the mobile phone may not directly display the first display object on the second screen, but may continue decreasing the font size of the to-be-displayed character string corresponding to the target display object under a condition that the font size of the to-be-displayed character string corresponding to the target display object after the font size is decreased is greater than the preset font size, so as to further decrease the length of the to-be-displayed character string corresponding to the first display object, thereby further increasing the length of the to-be-displayed character string corresponding to the first display object that can be accommodated by the first display object.

Figure 9E:
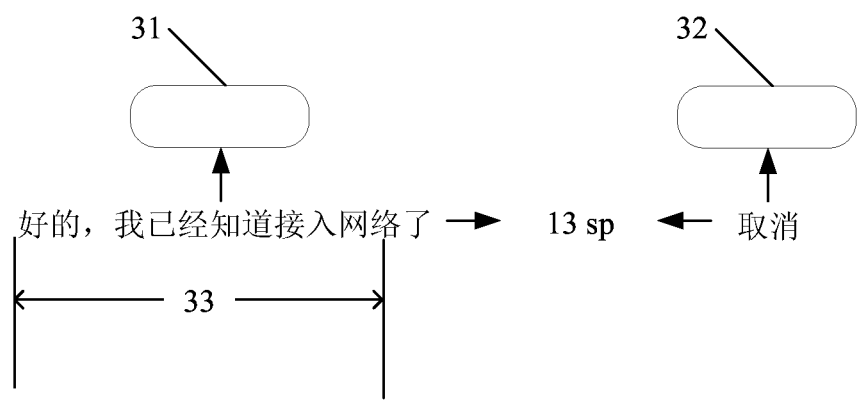
FIG. 9e is another schematic diagram of comparison between a length of a to-be-displayed character string and a width of effective display space according to an embodiment of this application.

For example, referring to FIG. 9e, the mobile phone may further decrease, to 13 sp, the font size of the to-be-displayed character string corresponding to the first display object 31 and the font size of the to-be-displayed character string corresponding to the second display object 32 in a scenario shown in FIG. 9d.

When a decreased font size of the to-be-displayed character string corresponding to the target display object is equal to the preset font size, the mobile phone may perform the following step 207, or perform the following step 208 and step 209.

207. If the length of the to-be-displayed character string corresponding to the first display object after the font size is decreased is greater than the width of the effective display space, and the font size of the to-be-displayed character string corresponding to the target display object after the font size is decreased is the preset font size, the mobile phone displays the first display object and the second display object on the second screen.

The preset font size herein may be a smallest font size to which the to-be-displayed character string corresponding to the target display object can be decreased. A specific value may be set based on an actual need. For example, the preset font size may be 13 sp.

After the font size of the to-be-displayed character string corresponding to the first display object is decreased in step 204, if the length of the to-be-displayed character string corresponding to the first display object after the font size is decreased is greater than the width of the effective display space, and the decreased font size of the to-be-displayed character string corresponding to the target display object is equal to the preset font size, that is, when the to-be-displayed character string corresponding to the target display object has been decreased to the smallest font size, the mobile phone may display the first display object and the second display object on the second screen.

Figure 9F:
FIG. 9f is a schematic diagram of another type of screen displaying according to an embodiment of this application.

In this case, the content displayed in the first display object is the to-be-displayed character string corresponding to the first display object, and when displayed, the to-be-displayed character string is truncated by the frame of the first display object. For example, referring to FIG. 9f, after the font size of the to-be-displayed character string corresponding to the target display object is decreased to the preset font size, "好的,, 我知道已经 接入网络了" is truncated when displayed.

208. If the length of the to-be-displayed character string corresponding to the first display object after the font size is decreased is greater than the width of the effective display space, and the font size of the to-be-displayed character string corresponding to the target display object after the font size is decreased is the preset font size, the mobile phone replaces the to-be-displayed character string corresponding to the first display object with associated content. A length of the associated content is less than or equal to the width of the effective display space.

209. The mobile phone displays the first display object and the second display object on the second screen.

In step 208 and step 209, after the font size of the to-be-displayed character string corresponding to the first display object is decreased in step 204, if the length of the to-be-displayed character string corresponding to the first display object after the font size is decreased is greater than the width of the effective display space, and the decreased font size of the to-be-displayed character string corresponding to the target display object is equal to the preset font size, that is, when the to-be-displayed character string corresponding to the target display object has been decreased to the smallest font size, and the increased width of the first display object cannot accommodate the entire to-be-displayed character string corresponding to the first display object, in this case, the mobile phone may replace the to-be-displayed character string corresponding to the first display object with associated content whose length is less than the increased length of the first display object. Therefore, the first display object can accommodate the entire associated content, and the associated content is not truncated by the frame of the first display object.

It should be noted that, in step 209, the associated content of the to-be-displayed character string instead of the to-be-displayed character string itself is displayed within the frame of the first display object.

The associated content of the to-be-displayed character string may include at least one of another character string different from the to-be-displayed character string corresponding to the first display object, an emoticon, or a picture, and the another character string includes an abbreviation of the to-be-displayed character string corresponding to the first display object. In this way, the length of the associated content may usually be less than the length of the to-be-displayed character string corresponding to the first display object, and therefore, the length of the associated content is more likely to be less than or equal to the width of the effective display space.

In this embodiment of this application, replaced content and the to-be-displayed character string corresponding to the first display object generally represent a same or similar meaning. For example, when the to-be-displayed character string corresponding to the first display object is "好的,, 我已经知道 接入网络了", "确定", "继续", or the like, the replaced content may be another character string "ok" (which may be a character string whose language type is different from that of the to-be-displayed character string), an emoticon of a smiling face such as "(*ˆVˆ*)", a picture of a smiling face, a picture of an ok gesture, or the like. When the to-be-displayed character string corresponding to the first display object is "上一步", the replaced content may be a picture of a gesture pointing to the left, or the like. When the to-be-displayed character string corresponding to the first display object is "下一步", the replaced content may be a picture of a gesture pointing to the right, or the like.

Figures 1, 2, 10A:
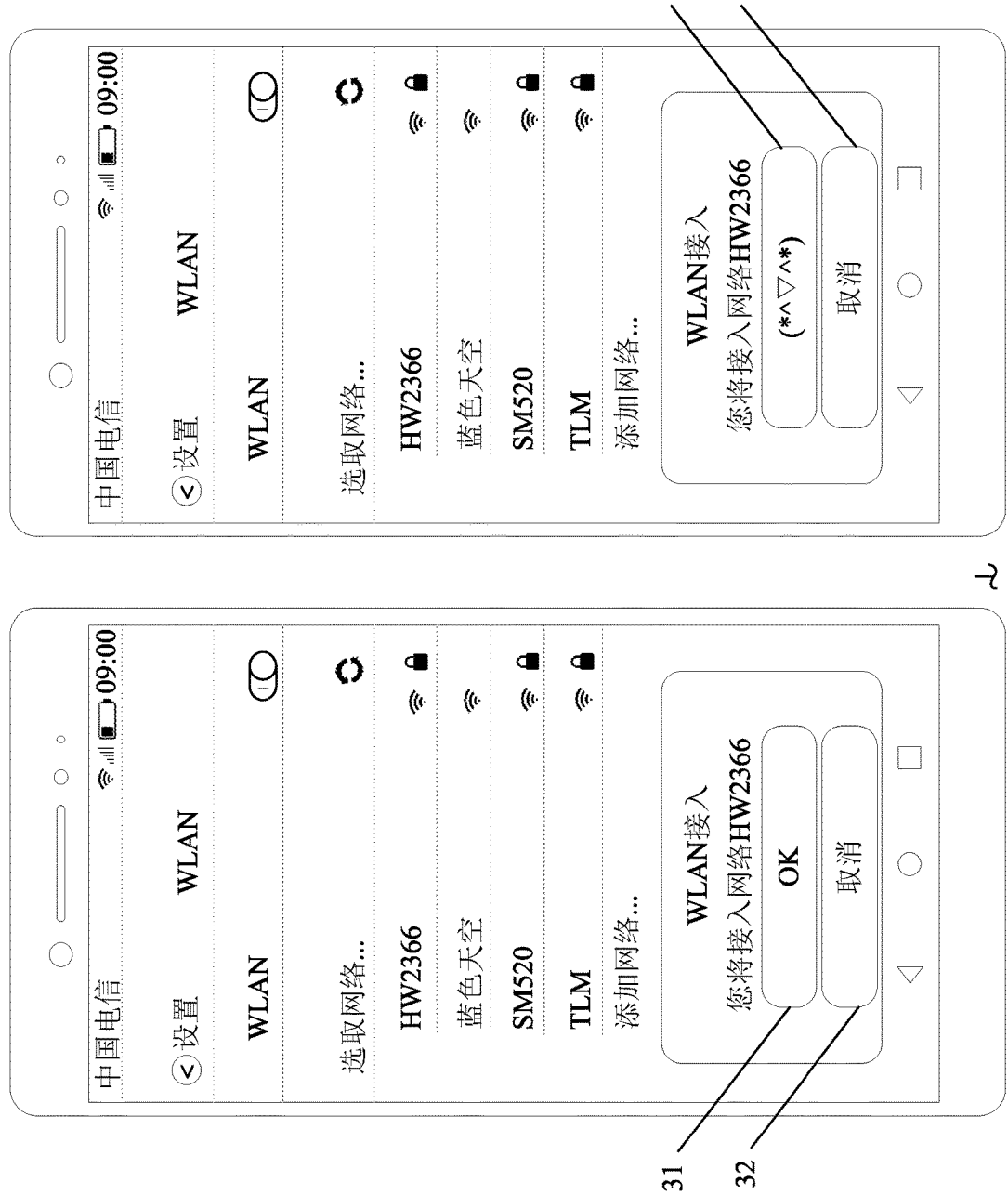
FIG. 10a-1 and FIG. 10a-2 are a schematic diagram of associated content according to an embodiment of this application.
Figures 2, 10A:
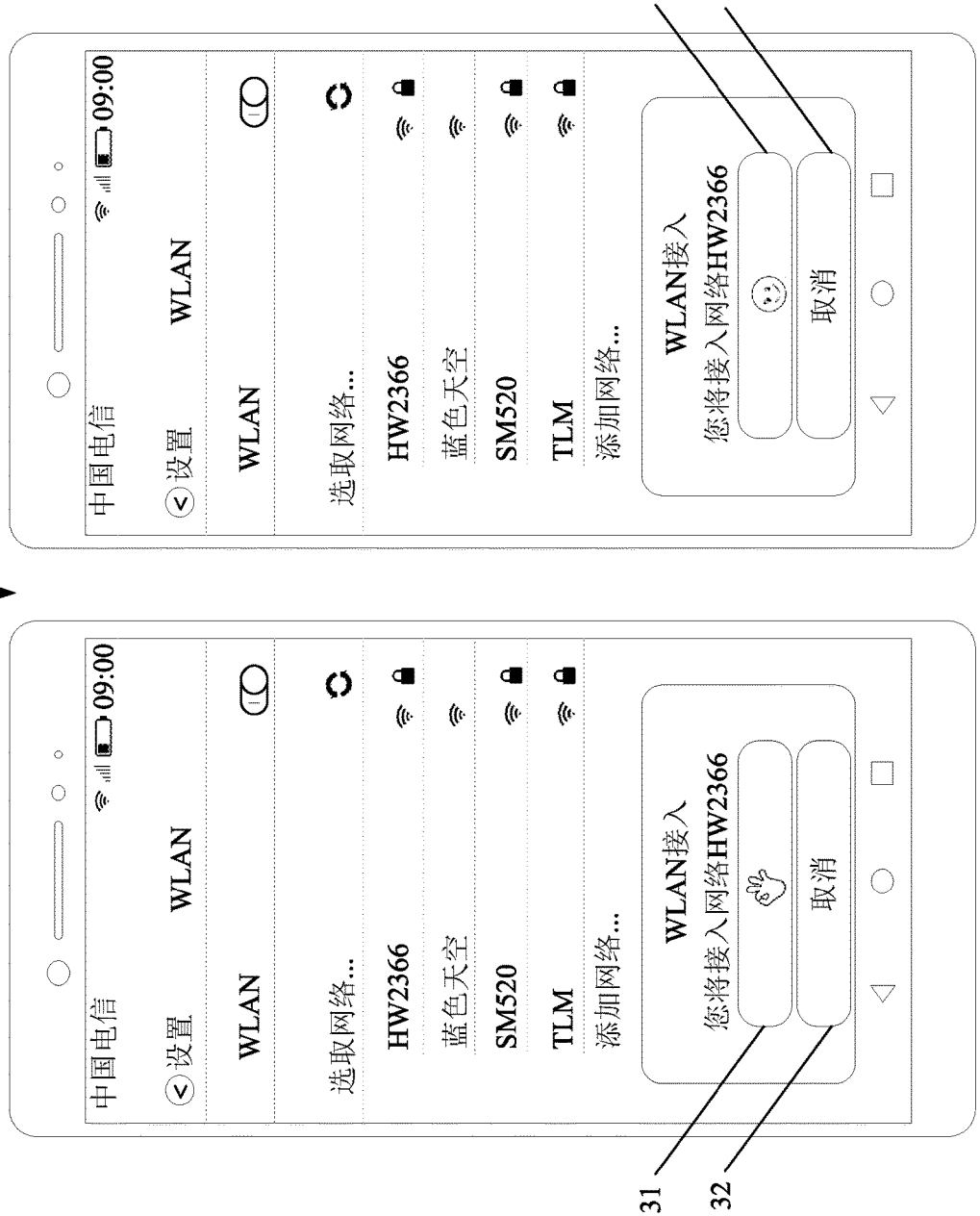

For example, for the first display object 31 after the to-be-displayed character string is replaced with the associated content, refer to FIG. 10a-1 and FIG. 10a-2.

Figure 10B:
FIG. 10b is a schematic diagram of another type of associated content according to an embodiment of this application.

In addition, it should be noted that after the to-be-displayed character string corresponding to the first display object is replaced with the associated content, a font size in the second display object may be kept as the preset font size, or may be restored to a font size before decreasing. This is not specifically limited herein. In addition, after the to-be-displayed character string corresponding to the first display object is replaced with the associated content, the to-be-displayed character string corresponding to the second display object may be replaced with its associated content. For example, for a corresponding scenario in which the to-be-displayed character strings corresponding to the first display object 31 and the second display object 32 are respectively replaced with their associated content, refer to FIG. 10b.

In another implementation, after step 202, that the mobile phone displays the first display object and the second display object on a second screen may further include the following steps.

210. If the length of the to-be-displayed character string corresponding to the first display object is greater than the width of the effective display space, the mobile phone replaces the to-be-displayed character string corresponding to the first display object with associated content, where a length of the associated content is less than or equal to the width of the effective display space.

211. Display the first display object and the second display object on the second screen.

In step 210 and step 211, when the length of the to-be-displayed character string corresponding to the first display object is greater than the width that is of the effective display space and that is determined in step 202, the length of the to-be-displayed character string corresponding to the first display object is definitely greater than an increased width of the first display object, and the width of the first display object cannot accommodate the entire to-be-displayed character string corresponding to the first display object. In this case, the mobile phone may replace the to-be-displayed character string corresponding to the first display object with the associated content whose length is less than the increased length of the first display object, so that the first display object can accommodate the entire associated content, and the associated content is not truncated by the frame of the first display object.

In addition, in this embodiment of this application, the first display object and the second display object may correspond to a same associated display object group. To be specific, the first display object and the second display object are associated display objects. Each associated display object group may include N display objects. To-be-displayed character strings corresponding to the N display objects have similar or opposite meanings. Positions of the N display objects on a same screen are close. An operation manner of the N display objects may include a touch manner or a tap manner, and the touch manner or the tap manner may include a tap, a double tap, a touch & hold, or the like.

Figure 11:
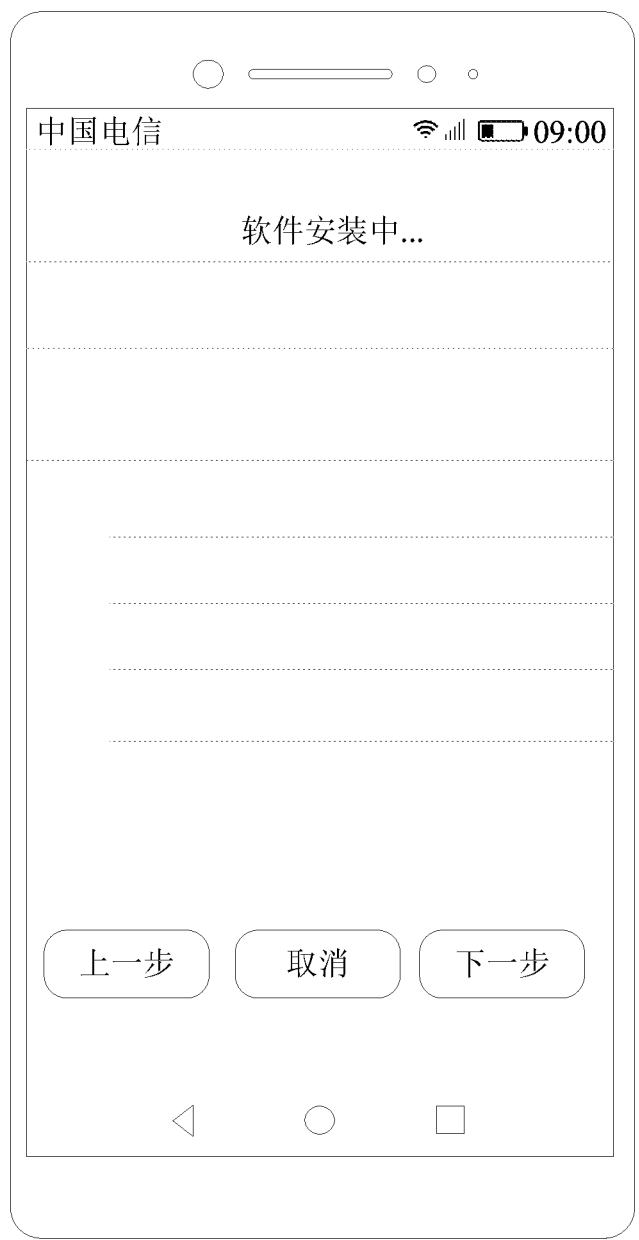
FIG. 11 is a schematic diagram of another type of screen displaying according to an embodiment of this application.

For example, the N display objects in the associated display object group may be a plurality of display objects included in a same dialog box. The first display object and the second display object are two display objects in a same dialog box. In a possible implementation, a value of N is 2. In this case, the associated display object group includes only the first display object and the second display object. In another implementation, a value of N is greater than 2. In this case, the associated display object group includes the first display object, the second display object, and another display object. For example, referring to FIG. 11, the associated display object group may include three display objects respectively used to display "上一步", "取消", and "下一步". The first display object and the second display object may be any two of the three display objects shown in FIG. 11. The N display objects in the associated display object group may correspond to a same display object type, or may correspond to different display object types. Details are not described herein. For example, the first display object and the second display object in a same associated display object group may also be any group of the following associated display objects: confirm and cancel, continue and return, enter and exit, previous and next, next and return, or the like.

Specifically, the electronic device may store a preset mapping relationship between an associated display object group and a plurality of display objects. Based on the mapping relationship, the mobile phone may determine that the first display object and the second display object correspond to a same associated display object group. Specifically, the mapping relationship may be stored in a database or a data table. The mobile phone may determine a correspondence between the first display object and another display object in a corresponding associated display object group by searching for data in the database, or searching for data in the data table.

Alternatively, a first identifier corresponding to the first display object and a second identifier corresponding to the second display object may have a preset association relationship. For example, an identifier 1 and an identifier 2 have a preset association relationship. The first identifier corresponding to the first display object is the identifier 1, and the second identifier corresponding to the second display object is the identifier 2. Alternatively, that a first identifier and a second identifier have a preset association relationship may further include: the first identifier is the same as the second identifier.

It should be noted that the foregoing embodiment of this application is described by using an example in which the first screen and the second screen each include only two display objects. In another embodiment, the first screen and the second screen may further include a third display object. When the first display object and the second display object correspond to a same associated display object group, and the third display object does not correspond to the associated display object group, referring to FIG. 12, the mobile device may update, on a second screen 38, the first positional relationship between the first display object 31 and the second display object 32 into the second positional relationship, while keeping a position of a third display object 36 on a first screen 37 unchanged.

In a specific implementation, the mobile phone may perform deployment and control based on an AlertController class included in existing Google and by using an HwAlertController class to inherit the AlertController class, thereby modifying the positional relationship between the first display object and the second display object to increase the width of the first display object. Specifically, the mobile phone may add ultra-long monitoring for the first display object by using a setUpView class of the HwAlertController; and when the length of the to-be-displayed character string exceeds the width of the first display object, modify the positional relationship between the first display object and the second display object. In addition, the mobile phone may further decrease, by invoking an HwWidgetFactory.autoTextSize (Textview textview, Context context) class, the font size of the to-be-displayed character string corresponding to the target display object.

It may be understood that, to implement the foregoing functions, the electronic device includes a corresponding hardware structure and/or software module for implementing each function. A person of ordinary skill in the art should easily be aware that, in combination with the examples of algorithms steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the electronic device based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 13:
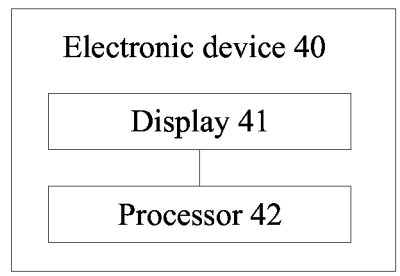
FIG. 13 is a schematic structural diagram of an electronic device according to an embodiment of this application.

When each functional module is obtained through division based on each corresponding function, FIG. 13 is a schematic diagram of possible composition of an electronic device 40 according to the foregoing embodiment. As shown in FIG. 13, the electronic device 40 may include a display 41 and one or more processors 42. The display 41 is configured to display content based on an instruction of the one or more processors 42. The processor 42 may be configured to perform step 200 and step 201 shown in FIG. 5. Specifically, the one or more processors 42 may be configured to: instruct the display 41 to display a first screen, where the first screen includes a first display object and a second display object, and the first display object and the second display object on the first screen have a first positional relationship; in response to determining that a length of a to-be-displayed character string corresponding to the first display object is greater than a first width of the first display object on the first screen, determine to display the first display object and the second display object on a second screen, where the first display object and the second display object on the second screen have a second positional relationship, the second positional relationship is different from the first positional relationship, and a second width of the first display object corresponding to the second positional relationship is greater than the first width of the first display object corresponding to the first positional relationship; and instruct the display 41 to perform displaying.

In addition, the processor 42 may further be configured to perform step 202 to step 211 in FIG. 7a and FIG. 7b, and/or be used in another process of the technology described in this specification.

It should be noted that, all related content of the steps in the foregoing method embodiments can be cited in function descriptions of corresponding functional modules, and details are not described herein again.

Figure 14:
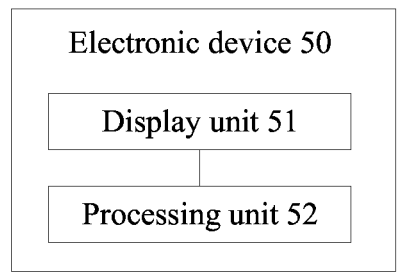
FIG. 14 is a schematic structural diagram of another electronic device according to an embodiment of this application.

When each functional module is obtained through division based on each corresponding function, FIG. 14 is another possible schematic structural diagram of an electronic device 50 according to the foregoing embodiment. The electronic device 50 may include a display unit 51 and a processing unit 52. A function of the display unit 51 may correspond to a function of the display 41 in FIG. 13. A function of the processing unit 52 may correspond to a function of the processor 42 in FIG. 13.

Certainly, the electronic device includes but is not limited to the units and modules enumerated in the foregoing descriptions. For example, the electronic device may further include a storage unit. The storage unit is configured to store program code and related data of the electronic device, for example, an association relationship between an index of a demonstration content fragment and a function identifier. The electronic device may further include a communications unit. The communications unit may include a sending unit configured to send data or a signal to another device, a receiving unit configured to receive data or a signal sent by another device, and the like. In addition, specific functions that can be implemented by the foregoing functional units include but are not limited to the functions corresponding to the method steps in the foregoing embodiment. For detailed descriptions of other units of the electronic device, refer to detailed descriptions of method steps corresponding to the units. Details are not described again herein in this embodiment of this application.

The processing unit 52 may be a processor or a controller, and may be, for example, a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), another programmable logic device, a transistor logic device, a hardware component, or any combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage unit may be a memory. The communications unit may be a transceiver, an RF circuit, a communications interface, or the like.

When the processing unit 52 is a processor, the communications unit is an RF circuit, the storage unit is a memory, and the display unit 51 is a display, the electronic device provided in this embodiment of this application may be the mobile phone shown in FIG. 3. The communications unit may further include a Wi-Fi module and a Bluetooth module.

The foregoing descriptions about the implementations allow a person skilled in the art to clearly understand that, for the purpose of convenient and brief description, the foregoing functional module division is merely used as an example for description. In actual application, the foregoing functions can be implemented by different functional modules depending on a requirement. To be specific, an internal structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division, and another division manner may be used in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be in electrical, mechanical, or other forms.

The units described as separate parts may or may not be physically separate, and parts displayed as units may be one or more physical units, may be located in one place, or may be distributed in different places. Some or all of the units may be selected depending on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

All or some of the foregoing embodiments may be implemented by using software, hardware, firmware, or any combination thereof. When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a computer program product. The computer program product is stored in a storage medium and includes several instructions for instructing a device (which may be a single-chip microcomputer, a chip, or the like) or a processor (processor) to perform all or some of the steps of the methods in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
displaying, by an electronic device, a first display object and a second display object on a first screen, wherein a position of the first display object on the first screen relative to a position of the second display object on the first screen is a first positional relationship, and the first display object comprises a first character string in a first language;
detecting, by the electronic device, a user operation of switching language;
in response to detecting the user operation, stopping, by the electronic device, from displaying the first display object and the second display object on the first screen; and
displaying, by the electronic device, the first display object and the second display object on a second screen;
wherein a position of the first display object on the second screen relative to a position of the second display object on the second screen is a second positional relationship, and the second positional relationship is different from the first positional relationship; and
wherein the first display object on the second screen displays the first character string in a second language, and a length of the first character string in the first language differs from a length of the first character string in the second language.

2. The method according to claim 1, wherein:
the first positional relationship comprises:
the first display object and the second display object on the first screen are arranged in parallel in a same horizontal direction; and
the second positional relationship comprises:
the first display object and the second display object on the second screen are arranged other than in parallel in the same horizontal direction.

3. The method according to claim 2, wherein the first display object and the second display object on the first screen and the second screen being arranged other than in parallel in the same horizontal direction comprises:
the first display object and the second display object on the second screen are aligned in a same vertical direction;
the first display object and the second display object on the second screen are arranged in a stepped shape in a vertical direction;
the first display object and the second display object on the second screen are arranged in parallel in a same diagonal direction; or
the first display object and the second display object on the second screen are arranged in different diagonal directions.

4. The method according to claim 1, wherein on the second screen, a height of the first display object is the same as a height of the second display object.

5. The method according to claim 1, wherein a font size of the first character string in the first language on the first screen differs from a font size of the first character string in the second language on the second screen.

6. The method according to claim 1, wherein the first display object and the second display object are displayed in a same dialog box on the first screen and on the second screen.

7. An electronic device, comprising:
a display; and
one or more processors, wherein the display is configured to display content based on an instruction of the one or more processors, and the one or more processors are configured to:
instruct the display to display a first display object and a second display object on a first screen, wherein a position of the first display object on the first screen relative to a position of the second display object on the first screen is a first positional relationship, and the first display object comprises a first character string in a first language;
after displaying the first display object and the second display object on the first screen, detecting a user operation of switching language; and
in response to detecting the user operation, stopping from displaying the first display object and the second display object on the first screen; and
instruct the display to display the first display object and the second display object on a second screen;
wherein a position of the first display object on the second screen relative to a position of the second display object on the second screen is a second positional relationship, and the second positional relationship is different from the first positional relationship; and
wherein the first display object on the second screen displays the first character string in a second language, and a length of the first character string in the first language differs from a length of the first character string in the second language.

8. The electronic device according to claim 7, wherein:
the first positional relationship comprises:
the first display object and the second display object on the first screen are arranged in parallel in a same horizontal direction; and
the second positional relationship comprises:
the first display object and the second display object on the second screen are arranged other than in parallel in the same horizontal direction.

9. The electronic device according to claim 7, wherein the first display object and the second display object on the second screen being arranged other than in parallel in the same horizontal direction comprises:
the first display object and the second display object on the second screen are aligned in a same vertical direction;
the first display object and the second display object on the second screen are arranged in a stepped shape in a vertical direction;
the first display object and the second display object on the second screen are arranged in parallel in a same diagonal direction; or
the first display object and the second display object on the second screen are arranged in different diagonal directions.

10. The electronic device according to claim 7, wherein on the second screen, a height of the first display object is the same as a height of the second display object.

11. The electronic device according to claim 7, wherein a font size of the first character string in the first language on the first screen differs from a font size of the first character string in the second language on the second screen.

12. The electronic device according to claim 7, wherein the first display object and the second display object are displayed in a same dialog box on the first screen and on the second screen.

13. A non-transitory computer storage medium, comprising a computer instruction, wherein when the computer instruction is run on an electronic device, the electronic device is caused to perform the following:

displaying a first display object and a second display object on a first screen, wherein a position of the first display object on the first screen relative to a position of the second display object on the first screen is a first positional relationship, and the first display object comprises a first character string in a first language;

detecting a user operation of switching language;

in response to detecting the user operation, stopping displaying the first display object and the second display object on the first screen; and displaying the first display object and the second display object on a second screen;

wherein a position of the first display object on the second screen relative to a position of the second display object on the second screen is a second positional relationship, and the second positional relationship is different from the first positional relationship; and wherein the first display object on the second screen displays the first character string in a second language, and a length of the first character string in the first language differs from a length of the first character string in the second language.

14. The non-transitory computer storage medium according to claim 13, wherein:

the first positional relationship comprises:

the first display object and the second display object on the first screen are arranged in parallel in a same horizontal direction; and the second positional relationship comprises:

the first display object and the second display object on the second screen are arranged other than in parallel in the same horizontal direction.

15. The non-transitory computer storage medium according to claim 13, wherein the first display object and the second display object on the first screen and the second screen being arranged other than in parallel in the same horizontal direction comprises:

the first display object and the second display object on the second screen are aligned in a same vertical direction;

the first display object and the second display object on the second screen are arranged in a stepped shape in a vertical direction;

the first display object and the second display object on the second screen are arranged in parallel in a same diagonal direction; or the first display object and the second display object on the second screen are arranged in different diagonal directions.

16. The non-transitory computer storage medium according to claim 13, wherein on the second screen, a height of the first display object is the same as a height of the second display object.

17. The non-transitory computer storage medium according to claim 13, wherein a font size of the first character string in the first language on the first screen differs from a font size of the first character string in the second language on the second screen.

18. The non-transitory computer storage medium according to claim 13, wherein the first display object and the second display object are displayed in a same dialog box on the first screen and on the second screen.

\* \* \* \* \*